United States Patent
Dalal et al.

(10) Patent No.: US 10,889,072 B2
(45) Date of Patent: *Jan. 12, 2021

(54) METHOD FOR PRE-PREG MANUFACTURING

(71) Applicant: The Boeing Company, Chicago, IL (US)

(72) Inventors: Hardik Dalal, Seattle, WA (US); Alain A. Adjorlolo, Shoreline, WA (US); Adam F. Gross, Santa Monica, CA (US); Andrew P. Nowak, Los Angeles, CA (US); Brad Andrew Coxon, Everett, WA (US); Kurtis Willden, Kent, WA (US); Daniel M. Rotter, Lake Forest Park, WA (US); Stephen Lee Metschan, Black Diamond, WA (US); Berryinne Decker, Macedonia, OH (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,092

(22) Filed: Jun. 3, 2019

(65) Prior Publication Data
US 2019/0283341 A1 Sep. 19, 2019

Related U.S. Application Data

(63) Continuation-in-part of application No. 15/163,180, filed on May 24, 2016, now Pat. No. 10,308,000.

(51) Int. Cl.
*B29C 70/30* (2006.01)
*C09J 7/38* (2018.01)
*B29C 33/68* (2006.01)

(52) U.S. Cl.
CPC .............. *B29C 70/30* (2013.01); *B29C 33/68* (2013.01); *C09J 7/38* (2018.01); *C09J 2203/00* (2013.01)

(58) Field of Classification Search
CPC ....................................................... B29C 70/30
(Continued)

(56) References Cited

U.S. PATENT DOCUMENTS

| 5,106,383 A | 4/1992 | Mulder et al. |
| 5,470,622 A | 11/1995 | Rinde |

(Continued)

FOREIGN PATENT DOCUMENTS

| CN | 102124067 A | 7/2011 |
| CN | 102203030 A | 9/2011 |

(Continued)

OTHER PUBLICATIONS

"Adhesion Properties of Styrene-Butadiene-Styrene Triblock Copolymer-Based Pressure-Sensitive Adhesives for Protecting Opto-functionalized Sheets," Asian Journal of Chemistry; vol. 25, No. 9 (2013), 5233-5236 (Year: 2013).*

(Continued)

*Primary Examiner* — Matthew J Daniels
*Assistant Examiner* — Hana C Page
(74) *Attorney, Agent, or Firm* — MH2 Technology Law Group LLP

(57) ABSTRACT

The present disclosure is directed to a method of making a composite part. The method comprises covering a mold tool for a composite part with a parting film. The method further comprises laying up at least one layer of pre-preg on the parting film covering the mold tool to form a laid-up composite part and removing the laid-up composite part from the parting film. The parting film comprises a polymer sheet having a first major surface and a second major (Continued)

surface; and a first adhesive disposed on the first major surface of the polymer sheet, the first adhesive adhering the polymer sheet to the mold tool.

20 Claims, 12 Drawing Sheets

(58) Field of Classification Search
USPC .......................................................... 156/243
See application file for complete search history.

(56) References Cited

U.S. PATENT DOCUMENTS

| | | | |
|---|---|---|---|
| 10,155,062 B2 | 12/2018 | Dalal et al. | |
| 2011/0143134 A1* | 6/2011 | Emslander | B32B 7/06 428/352 |
| 2011/0198785 A1 | 8/2011 | Kester et al. | |
| 2012/0121866 A1* | 5/2012 | Hawkins | B29C 70/30 428/174 |
| 2013/0174396 A1* | 7/2013 | Torres Martinez | B21D 53/92 29/33 R |
| 2014/0284836 A1 | 9/2014 | Kline et al. | |
| 2015/0035204 A1 | 2/2015 | Stoner et al. | |
| 2016/0059443 A1* | 3/2016 | Thomas | B29C 33/68 156/247 |

FOREIGN PATENT DOCUMENTS

| | | | | |
|---|---|---|---|---|
| CN | 102555229 A | 7/2012 | | |
| EP | 0416765 A3 | 3/1991 | | |
| GB | 150592 | * | 1/1981 | ............. B32B 27/08 |
| GB | 1590592 | | 6/1981 | |
| WO | WO00/18555 A1 | 4/2000 | | |
| WO | 2010-022154 A2 | 2/2010 | | |
| WO | WO2018/143212 A1 | 12/2010 | | |

OTHER PUBLICATIONS

Holden. Thermoplastic Elastomer, Encyclopedia of Polymer Science and Technology, 2010 (Year: 2010).*
Guillaume De Crevoisier et al., "Switchable Tackiness and Wettability of a Liquid Crystalline Polymer", Science, vol. 285, Aug. 20, 1999, pp. 1246-1249.
G. De Crevoisier et al., "Structure of Fluorinated Side-Chain Smectic Copolymers: Role of the Copolymerization Statistics", Macromolecules, 35, 2002, pp. 3880-3888.
European Extended Search Report dated Oct. 23, 2017 in corresponding European Patent Application No. 17167670.3, 9 pages.
Author Unknown, Glossary of Terms, Pressure Sensitive Tape Council, PSTC, http://www.pstc.org/i4a/pages/index.cfm?pageID=3336%281%20pp%29, accessed May 23, 2016, pp. 1-6.
Choi et al., "Adhesion Properties of Styrene-Butadiene-Styrene Triblock Copolymer-Based Pressure-Sensitive Adhesives for Protecting Opto-functionalized Sheets," Asian Journal of Chrmistry, vol. 25, No. 9 (2013) 5233-5236.
Material Property Data: Kraton D1192E Linear Block Copolymer data sheet, 2 pages.
Ruffato et al., "Improving controllable adhesion on both rough and smooth surfaces with a hybrid electrostatic/gecko-like adhesive," Journal of Royal Society Interface 11:20131089, Jan. 2, 2014, 10 pages.
Holden, "Thermoplastic Elastomers," Encyclopedia of Polymer Science and Technology, 2010, 28 pages.
ThomasNet, "Pressure Sensitive Adhesives," https://thomasnet.com/articles/adhesives-sealants/pressure-sensitive-adhesives/, available Mary 23, 2010, retrieved Jan. 19, 2018, 2 pages.
Notification of Second Office Action and Search Report dated Mar. 20, 2020 in related corresponding Chinese Application No. 201710366462.9 (in English and Chinese with English Translation of Office Action provided), 10 pages.
Canadian Office Action dated Apr. 8, 2020 in corresponding Canadian Application No. 2,966,095, 7 pages.
Notification of First Office Action and Search Report dated Oct. 22, 2019 in related corresponding Chinese Application No. 201710366462.9 (in English and Chinese with English Translation of Office Action provided), 23 pages.

* cited by examiner

METHOD FOR PRE-PREG MANUFACTURING

RELATED APPLICATIONS

This application is a continuation-in-part of U.S. patent application Ser. No. 15/163,180, filed on May 24, 2016, now U.S. Pat. No. 10,308,000, issued on Jun. 4, 2019, the disclosure of which is incorporated herein by reference in its entirety.

FIELD OF THE DISCLOSURE

The present disclosure is directed to a pre-preg molding process for manufacturing composite parts.

BACKGROUND

Pre-preg is a term for "pre-impregnated" composite fibers in which a matrix material, such as epoxy, is already present in the fiber reinforcement before molding occurs. Pre-preg manufacturing techniques are often employed to manufacture composite parts for a variety of commercial uses, including the manufacture of aircraft, for example. Composite part manufacturing using pre-preg manufacturing methods can be a rate limiting step in the production of composite products.

Pre-preg is currently laid up on a molds covered with a polymer parting film during the manufacture of composite parts. In conventional practice, the parting film is replaced after every part is made, which consumes manufacturing time between parts and creates material waste in the form of the disposed of parting films. Furthermore, in order to enable easy release of pre-preg, the parting films are composed of non-adhesive polymer sheets, so that the adhesion between the pre-preg and parting film is low. Due to the low adhesion, the pre-preg may slip around on the surface during placement, thereby consuming additional time.

Existing methods for forming composite parts employ a mold release, which allows for cured laminate removal without damaging the part after curing the pre-preg. However, the use of mold release causes a build-up on the mold tool over time, thereby increasing the frequency of cleaning of the mold tool, which in turn reduces process efficiency.

Thus, there is a need in the art for improved parting films and techniques that can provide improved efficiency in pre-preg manufacturing processes. There is also a need in the art for improved parting films and techniques that will allow for easy removal of an uncured pre-preg without damaging the pre-preg.

SUMMARY

The present disclosure is directed to a method of making a composite part. The method comprises covering a mold tool for a composite part with a parting film, the parting film comprising a polymer sheet and a pressure sensitive adhesive. The parting film is positioned so that the polymer sheet is between the mold tool and the pressure sensitive adhesive. At least one layer of pre-preg is laid-up on the parting film covering the mold tool to form a laid-up composite part. The pre-preg comprises an adhesive. The laid-up composite part is removed from the parting film.

The present disclosure is also directed to a method of preparing a mold tool for lay up of a pre-preg. The method comprises covering a surface of the mold tool with a parting film, the parting film comprising a polymer sheet and a pressure sensitive adhesive. The parting film is positioned so that the polymer sheet is between the mold tool and the pressure sensitive adhesive. The pressure sensitive adhesive is capable of adhering to at least one layer of pre-preg during a laying up process for manufacturing a composite part, and of releasing the pre-preg after the laying up process is complete.

The present disclosure is directed to a method of making a composite part. The method comprises covering a mold tool for a composite part with a parting film. The method further comprises laying up at least one layer of pre-preg on the parting film covering the mold tool to form a laid-up composite part and removing the laid-up composite part from the parting film. The parting film comprises a polymer sheet having a first major surface and a second major surface; and a first adhesive disposed on the first major surface of the polymer sheet, the first adhesive adhering the polymer sheet to the mold tool.

The present disclosure is further directed to a method of making a composite part. The method comprises covering a mold tool for a composite part with a parting film, the parting film comprising (i) a polymer sheet having a first major surface and a second major surface and (ii) a pressure sensitive adhesive disposed on the second major surface. The method further comprises laying up at least one layer of pre-preg on the parting film covering the mold tool to form a laid-up composite part, the pre-preg being adhered to the parting film by the pressure sensitive adhesive. The laid-up composite part is removed from the parting film. The laying up and the removing of the laid-up composite part are repeated a plurality of times without removing the parting film from the mold tool.

The present disclosure is also directed to a parting film for covering a tool. The parting film comprises a polymer sheet comprising a first major surface and a second major surface. A first adhesive is disposed on the first major surface of the polymer sheet, the first adhesive for adhering the polymer sheet to the tool. A pressure sensitive adhesive is disposed on the second major surface of the polymer sheet, wherein the tool is selected from a mold tool and a cure tool.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

Figure 1A:
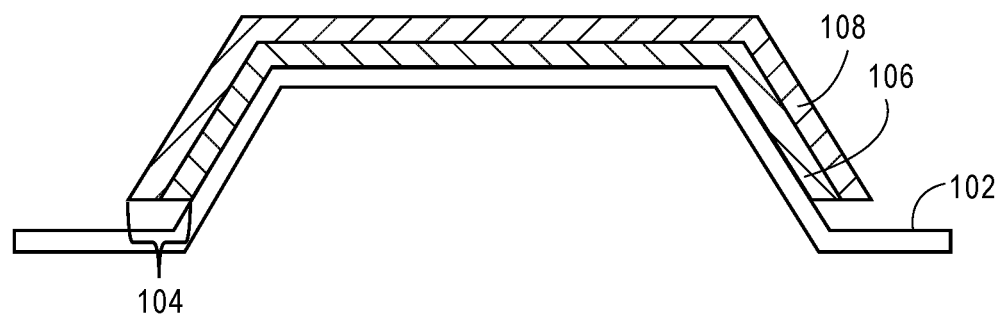
FIG. 1A shows a method for manufacturing a composite part using a pre-preg manufacturing technique, according to the present disclosure.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The present disclosure discloses a method for preparing a tool for fabricating a composite part, such as a mold tool and/or cure tool. The method includes covering the tool with a parting film, the parting film including at least one adhesive disposed therein. For example, the parting film can include a pressure sensitive adhesive film for adhering the parting film to a prep-preg. The parting film can also include an adhesive for adhering the parting film to the tool. The parting film has high enough surface adherence to the pre-preg to secure the pre-preg to the tool during a lay-up process. Additionally, use of the parting film allows a pre-preg laminate that has been laid-up on the tool to be removed from the tool and moved to a different tool, such as a cure tool, without damaging the un-cured pre-preg. For instance, the present method allows release of the pre-preg after molding without distorting the shape of the uncured pre-preg. The parting film of the present disclosure also allows for easy removal of the parting film itself from the tool. The use of the parting film of the present disclosure can decrease time for preparation and/or cleaning of the tool.

Figure 1B:
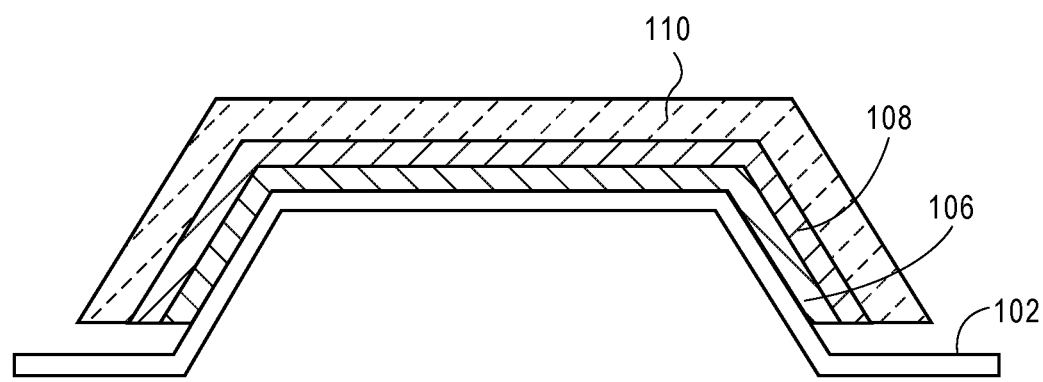
FIG. 1B shows the continued method of FIG. 1A for manufacturing a composite part using a pre-preg manufacturing technique, according to the present disclosure.
Figure 1C:
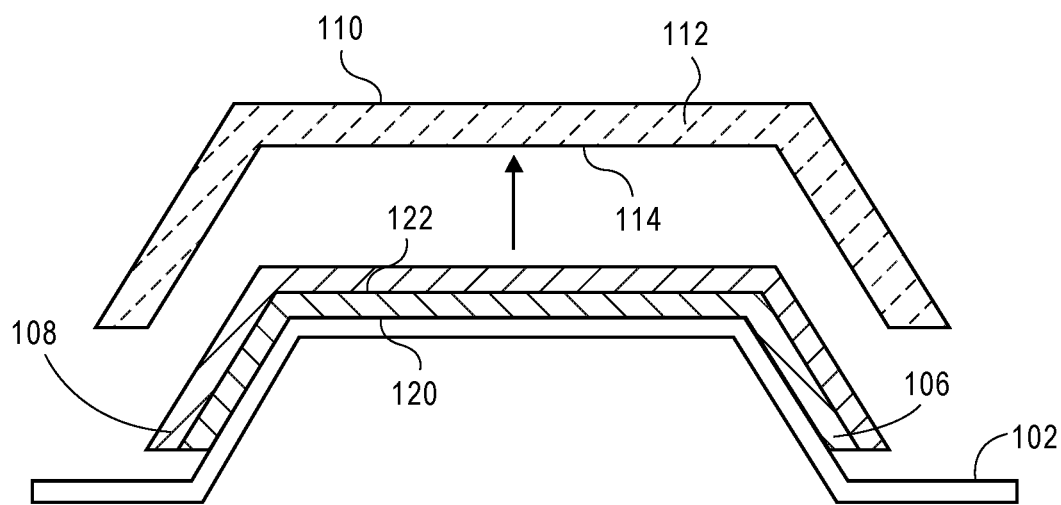
FIG. 1C shows the continued method of FIGS. 1A and 1B for manufacturing a composite part using a pre-preg manufacturing technique, according to the present disclosure.

The present disclosure is directed to a method for manufacturing a composite part using pre-preg manufacturing techniques. Referring to FIGS. 1A to 1C, the method involves covering a surface of a mold tool 102 with a parting film 104 comprising a polymer sheet 106 and a pressure sensitive adhesive 108. The pressure sensitive adhesive 108 can be in any suitable form that will provide the desired adhesion between the parting film 104 and the pre-preg, such as a layer deposited or otherwise attached to the polymer sheet 106. Referring to FIG. 1B, at least one layer of pre-preg 110 is laid-up on the parting film 104 to form a laid-up composite part 112. The pressure sensitive adhesive 108 allows the at least one layer of pre-preg 110 to adhere to the parting film 104 during the process, while having the ability to be removed from the pre-preg without leaving detrimental amounts of residue or otherwise damaging the composite part that is formed from the pre-preg.

As shown in FIG. 1C, after the lay up process is complete, the molded composite part 112 is removed from the parting film 104. During removal of the composite 112, the adhesive force holding the composite part 112 to the pressure sensitive adhesive is overcome by applying a force that is greater than the adhesive force to pull the composite part 112 from the pressure sensitive adhesive. The laying up step of FIG. 1B and the removing step of FIG. 1C can be carried out any number of times, such as one or a plurality of times, to form a desired number of composite parts 112 without removing the parting film 104 from the mold tool 102. As an example, the laying up step and the removing step can be carried out 5 to 50 times, such as 10 to 30 times or 15 to 25 times.

The pre-preg 110 can be any suitable pre-preg. Pre-pregs are well known in the art and generally comprise fibers in an adhesive resin. As an example, the pre-preg can comprise a carbon fiber reinforced plastic and/or one or more epoxy chemical groups that effectively act as an adhesive for adhering multiple pre-pregs together. The epoxy of the pre-preg also potentially adheres to other materials, such as the pressure sensitive polymer adhesive 108 of the parting film. As an example, the epoxy based pre-preg employed in the processes of the present disclosure can be said to have a threshold adhesive strength against a steel plate of greater than 10 kPa, such as about 30 to about 120 kPa, where the adhesive strength is measured using the tack test as described below with respect to FIG. 4, except that the steel probe is used without attaching a parting film 104.

The polymer sheet 106 can comprise any non-adhesive polymer material that is non-adhesive to the pre-preg 110 and that has the structural ability to act as a standalone substrate, conform to the mold surface and withstand other pre-preg processing conditions. The polymer sheet 106 generally does not contain acrylics, rubber, styrene-butadiene-styrene copolymers or other styrene copolymers. For example, suitable non-adhesive polymer sheets can comprise a material chosen from the polymers of polyethylene, polyethylene terephthalate ("PET"), fluorinated ethylene propylene ("FEP"), nylon and combinations thereof. The thickness of the polymer sheet 106 can range, for example, from 0.0001 to 0.01 inches, such as 0.001 to 0.004 inches.

The term "pressure sensitive adhesive" is defined herein to designate a distinct category of adhesive material that in a dry form (e.g., substantially free of both solvent and water) are aggressively and permanently tacky at room temperature and that firmly adhere to a variety of dissimilar surfaces at room temperature, including paper, plastic, glass, wood, cement and metal, upon mere contact without the need of more than 20 pounds per square inch of pressure being applied. These products require no activation by water, solvent or heat in order to exert a strong adhesive holding force toward such materials. They have sufficient cohesive holding power and an elastic nature so that despite their aggressive tackiness, they can be handled with the fingers and removed from smooth surfaces without leaving a significant residue. The phrase "substantially free" is defined herein to mean 5% by weight or less relative to the total weight of the composition. In an example, the "pressure sensitive adhesive" can have 0 to 5% combined weight of both solvent and water, such as 0 to about 3% by weight based on the total weight of the composition.

The pressure sensitive adhesive has the ability to conform to the surface of the pre-preg under pressure, thereby increasing surface area contact and, in turn, the Van der Waal forces between the adhesive and the pre-preg. It is believed that the increased Van der Waals forces provide the primary mechanism for adhesion. Because the adhesive can be applied in a dry form, drying or curing of the adhesive is not necessary to accomplish the desired adhesive force. Significant adhesion is not accomplished by chemical bonding, such as covalent or ionic chemical bonding, between the surfaces, as would occur with a dried or cured adhesive.

The pressure sensitive adhesive 108 is chosen to have the property of adhering to the pre-preg 110 sufficiently so as to significantly reduce slipping during lay up while, at the same time, having the ability to release the composite part 112 after lay-up is completed, without damaging the composite part (e.g., without pulling out carbon fiber or transferring material to pre-preg that will change the cured part properties in an undesirable manner). As an example, the pressure sensitive adhesive can have a peak tensile strength (kPa) between the pre-preg 110 and the adhesive coated parting film 104 of about 1 kPa to about 500 kPa peak adhesion force, such as about 3 kPa to about 50 kPa peak adhesion force, or about 5 kPa to about 25 kPa peak adhesion force, where the peak adhesion force is determined as describe herein with respect to FIG. 4.

The thickness of the pressure sensitive adhesive 108 can range, for example, from 0.0001 to 0.01 inches, such as 0.001 to 0.004 inches, or 0.001 to 0.002 inches. The pressure sensitive adhesive 108 of the parting film 104 can be reusable over multiple lay-up cycles to save the labor and waste of using a new parting film for every part. In addition, the pressure sensitive adhesive can have a glass transition temperature below 20° C., such as about negative 150° C. to about 0° C. or about negative 100° C. to about negative 50° C.; and can have greater than a 50% elasticity at room temperature (e.g., sufficient elasticity at 20° C. so as to be capable of exhibiting greater than 50% extension), such as about 100% to about 1000% elasticity. It is believed that the high elasticity can allow the material to hold together during release, thereby reducing the amount of adhesive residue that remains on the composite part.

The pressure sensitive adhesive can comprise linear or branched, random or block polymers having one, two, three or more monomer units. Example pressure sensitive adhesives can comprise a material chosen from the adhesives of acrylic resin, polyurethane, rubber, styrene-butadiene-styrene copolymers, ethylene vinyl acetate, styrene block copolymers, and combinations thereof, such as Styrene-ethylene/butylene-styrene (SEBS) block copolymer, Styrene-ethylene/propylene (SEP) block copolymer, Styrene-isoprene-styrene (SIS) block copolymer, or combinations thereof. As an example, the pressure sensitive adhesive comprises a material chosen from the adhesives of styrene-butadiene-styrene block copolymers, styrene-butadiene-styrene random copolymers and combinations thereof.

The pressure sensitive adhesive can include a block copolymer having a first block and a second block, the first block having a glass transition temperature of less than 20° C. and the second block having a glass transition temperature of greater than 20° C. Styrene-butadiene copolymers are one such example, where butadiene is a monomer that forms a polymer with a glass transition below room temperature while polystyrene has a glass transition temperature of 90-100° C. Specific examples of such polymers are shown in Table 2 below.

The polymer of the pressure sensitive adhesive can have a relatively high molecular weight to reduce or eliminate residue from the pressure sensitive adhesive transferring to the pre-preg during processing. As an example, the mass average molecular weight can be about 70,000 g/mol to about 1,500,000 g/mol, such as about 80,000 g/mol to about 1,200,000 g/mol, or about 100,000 g/mol to about 1,000,000 g/mol.

The amount of block copolymer in the pressure sensitive adhesive can be any suitable amount that will provide the desired properties. As an example, the amount of block copolymer can range from 50% to 100% by weight of the pressure sensitive adhesive, such as 80% to 99%, or 90% to 96% by weight, based on the total weight of the pressure sensitive adhesive. Because the adhesive is not dried or cured, the range of copolymer can be approximately the same both before and during adhesion of the pressure sensitive adhesive to the pre-preg, as well as after release of the composite part from the adhesive.

The compositions of the present disclosure can be additive free, meaning that only block copolymer is employed as the adhesive. Alternatively, in addition to the block copolymers describe herein, the pressure sensitive adhesives of the present disclosure can optionally include any other suitable ingredients in any desired amounts, such as carrier liquids, plasticizers, tackifiers, oxidation stabilizers and UV stabilizers and other such components to manage viscosity, adhesion strength, the ability to retain moisture content over time and other desired properties. Ingredients not expressly recited in the present disclosure can be limited and/or excluded from the pressure sensitive adhesive disclosed herein. Thus, the amounts of the thermoplastic polymer and any optional ingredients, such as carrier liquid, plasticizer, tackifiers, oxidation stabilizers and/or UV stabilizers can add up to 90% to 100% by weight of the total ingredients employed in the composites of the present disclosure, such as 95% to 100% by weight, or 98% to 100% by weight, or 99% to 100% by weight, or 100% by weight of the total ingredients.

As mentioned above, release of the composite part from the pressure sensitive adhesive is accomplished by applying sufficient tensile force to overcome the Van der Waals attraction between the composite part and the pressure sensitive adhesive. When applying force to release the composite part, the pressure sensitive adhesive will stretch as it pulls away from, thereby progressively reducing the shared surface area with the composite part, while still holding together so as to fail at the interface between the composite part and the adhesive. The elasticity allows the composite part to be more easily removed and helps to limit the amount of residue that remains on the composite part.

Referring again to FIG. 1C, removal of the laid-up composite part 112 can be performed in any suitable manner. For example, removal can be performed with a tool that adheres to the composite part 112 more strongly than does the pressure sensitive adhesive 108 of the parting film. For example, the tool can be a vacuum chuck. As another example, the tool can be have a surface comprising an adhesive that adheres with sufficient strength to the composite part 112 so as to be able to separate it from the parting film 104.

After removal of the composite part from the mold, little or no pressure sensitive adhesive remains on the composite layer. As an example, less than 10 micrograms/cm² of the pressure sensitive adhesive remains on a surface 114 of the completed part that was in contact with the pressure sensitive adhesive 108 during laying up of the pre-preg 110. As another example, less than 5 micrograms/cm², such as less than 2 micrograms/cm² or less than 1.5 micrograms/cm², of the pressure sensitive adhesive 108 remains on the surface 114 of the completed part. The amount of residue can be determined using the residue analysis procedure as described in Example 3 below.

The parting film 104 can be made by any suitable method. For example, the pressure sensitive adhesive can be applied onto a polymer sheet 106 using coating techniques for polymer deposition. A variety of polymer coating techniques are known in the art. If desired, the polymer sheet can be plasma-treated to improve adhesion between the non-adhesive polymer material and the pressure sensitive adhesive 108. Any suitable plasma treatment techniques for improving adhesion can be used. Techniques for plasma treating polymer films and other substrates are generally well known in the art. Corona treatment, for example, is a common industrial plasma treatment procedure that occurs in film coating production lines.

Figure 14:
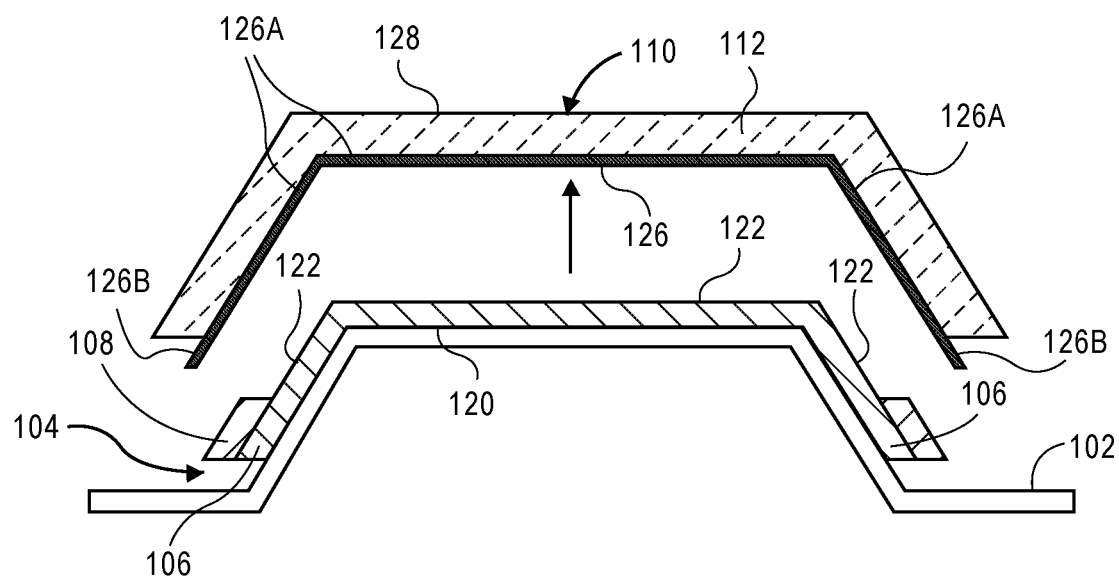
FIG. 14 shows a schematic, cross-sectional view of a parting film on a mold tool, which can be employed as part of a modified process of FIGS. 1A to 1C, according to an example of the present disclosure.

The parting film 104 employed in the method described herein with respect to FIGS. 1A to 1C can be modified in various ways. For example, FIG. 14 shows a parting film 104 comprising a polymer sheet 106 having a first major surface 120 and a second major surface 122 opposing the first major surface 120. As shown in FIG. 14, the pressure sensitive adhesive 108 is disposed only on a minor portion of the second major surface 122, such as at or near the edges of the polymer sheet 106. A sufficient amount of the second major surface 122 is covered so that the at least one layer of pre-preg 110 is adhered to the parting film 104 by the pressure sensitive adhesive 108 when the pre-preg is laid-up on the parting film 104, similarly as described above for FIG. 1B.

As shown in FIG. 14, the at least one layer of pre-preg 110 can optionally comprises a first pre-preg layer 126 and one or more additional pre-preg layers 128. The first pre-preg layer 126 comprises a composite region 126A that is part of the laid-up composite part and an excess region 126B. The excess region 126B extends past an edge of the one or more additional pre-preg layers 128. The excess region 126B contacts the pressure sensitive adhesive 108 when the pre-preg is laid-up on the parting film 104, whereas composite regions 126A do not. The methods of the present disclosure can comprise removing the excess region 126B from the composite part 112, either prior to, during or subsequent to curing. Trimming off excess region 126B after laying up the composite part 112 allows any residual pressure sensitive adhesive 108 to be removed from the composite part 112.

Figure 15:
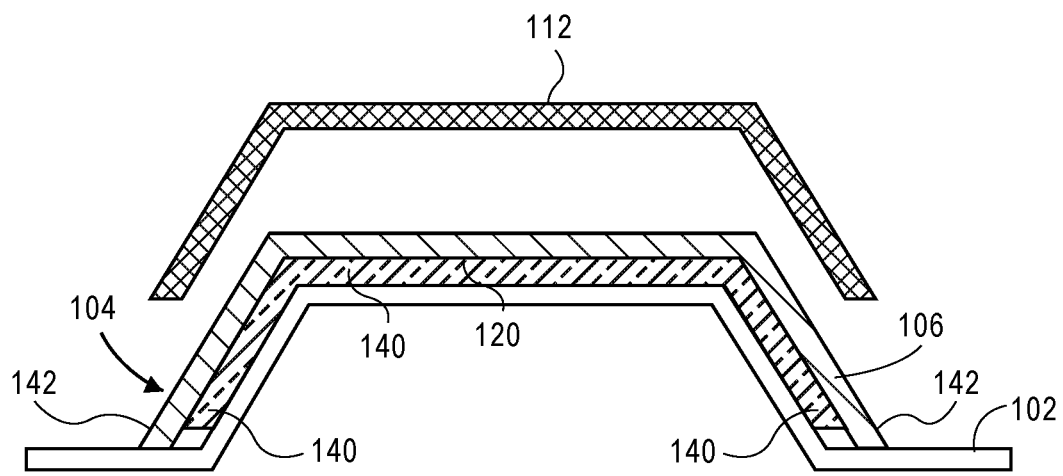
FIG. 15 shows a schematic, cross-sectional view of a parting film comprising an adhesive for adhering the parting film to a mold tool, which can be employed as part of a modified process of FIGS. 1A to 1C, according to an example of the present disclosure.
Figure 16:
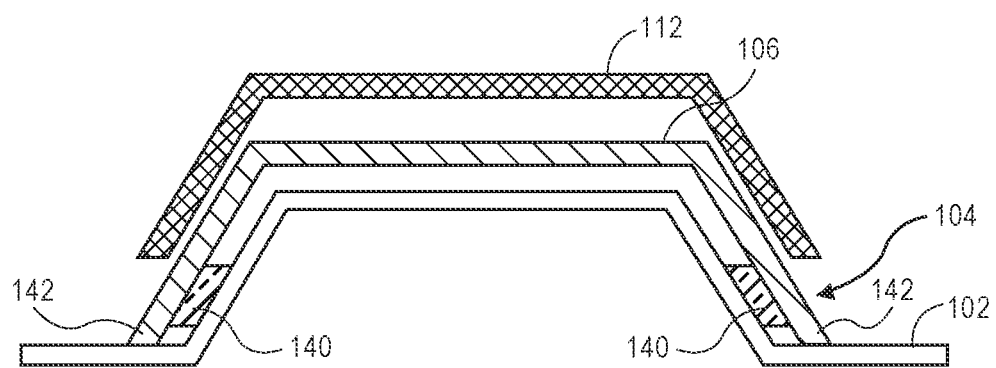
FIG. 16 shows a schematic, cross-sectional view of a parting film comprising an adhesive for adhering the parting film to a mold tool, which can be employed as part of a modified process of FIGS. 1A to 1C, according to an example of the present disclosure.

The present disclosure is also directed to a method of making a composite part, as described, for example, with respect to FIGS. 1A to 1C and FIG. 14 herein, the method comprising covering the mold tool 102 with a parting film 104. The parting film 104 comprises a polymer sheet 106 having a first major surface 120 and a second major surface 122. Referring to FIGS. 15 and 16, a first adhesive 140 is disposed on the first major surface 120 of the polymer sheet 106. The first adhesive 140 acts to adhere the polymer sheet 106 to the mold tool 102 prior to laying up the at least one layer of pre-preg 110 on the parting film 104. As described above, the method comprises repeating the laying up and the removing of the laid-up composite part 112 a plurality of times without removing the parting film 104 from the mold tool 102.

The first adhesive 140 can be any adhesive that creates sufficient tack at layup conditions, and that will not cure at layup conditions or contaminate the laid-up composite part 112. As an example, the first adhesive 140 is chosen from pressure sensitive adhesives, adhesives of acrylic resin, polyurethane, rubber, styrene-butadiene-styrene copolymer, ethylene vinyl acetate, styrene block copolymers, silicone based adhesives and combinations thereof.

As shown in FIG. 16, the first adhesive 140 may be disposed only on a minor portion of the first major surface 120, such as where the minor portion includes an edge of the first major surface 120. The term "minor portion" as employed herein is defined as being less than 50%. In an example, the minor portion can range from about 1% to about 40% of the first major surface 120, such as about 5% to about 30%, or about 10% to about 25%. Disposing the first adhesive 140 on only a minor portion of the first major surface 120 potentially saves time to apply and remove the carrier film, as well as reduces cost. It also may expand the number of options of adhesives that will work for this application.

As shown in FIG. 15, the first adhesive 140 may be disposed on a major portion of the first major surface 120. The term "major portion" as employed herein is defined as being 50% or more. In an example, the major portion can range from 50% to 100% of the first major surface 120, such as about 70% to about 99%, or about 75% to about 98%.

In an example, as shown in FIGS. 15 and 16, the edge 142 of the parting film 104 can extend past the first adhesive 140 to ensure adhesive 140 does not contact the at least one pre-preg 110, as shown in FIG. 16. This can reduce or prevent damage to the pre-preg 110 and/or decrease the likelihood of contaminating the composite part 112 with adhesive residue.

The parting film 104 can include the first adhesive 140 on the first major surface 120 either with or without a pressure sensitive adhesive 108 on the second major surface 122. FIGS. 15 and 16 illustrate examples of the parting film 104 without a pressure sensitive adhesive 108. When applied, the pressure sensitive adhesive 108 can be disposed either on a major portion, such as shown in FIGS. 1A to 1C, or only on a minor portion, of the second major surface, as shown in FIG. 14, where the terms "major portion" and "minor portion" are as defined herein above. For example, the major portion can range from 50% to 100% of the second major surface 122, such as about 70% to about 99%, or about 75% to about 98%. In an example, the minor portion can range from about 1% to about 40% of the second major surface, such as about 5% to about 30%, or about 10% to about 25%. The first adhesive 140 can comprise the same material or a different material than the pressure sensitive adhesive 108. Each of the first adhesive 140 and the pressure sensitive adhesive 108 are chosen to provide the desired tack at an appropriate temperature range at which it will be used (e.g., at 60° F. to 75° F.). The first adhesive 140 can provide a different tack level than the pressure sensitive adhesive 108.

The first adhesive 140 can be chosen to have an adhesive strength that will maintain adherence of the parting film 104 to the mold tool 102 during removal of the composite part 112, while still allowing for easy removal of the parting film 104 from the mold tool 102 when desired. Once adhered to the mold tool 102, the parting film 104 can be removed, for example, by mechanical peeling, temperature change (hot or cold), or by application of electricity. Such techniques for releasing an adhesive from a surface are generally well known in the art.

Figure 17:
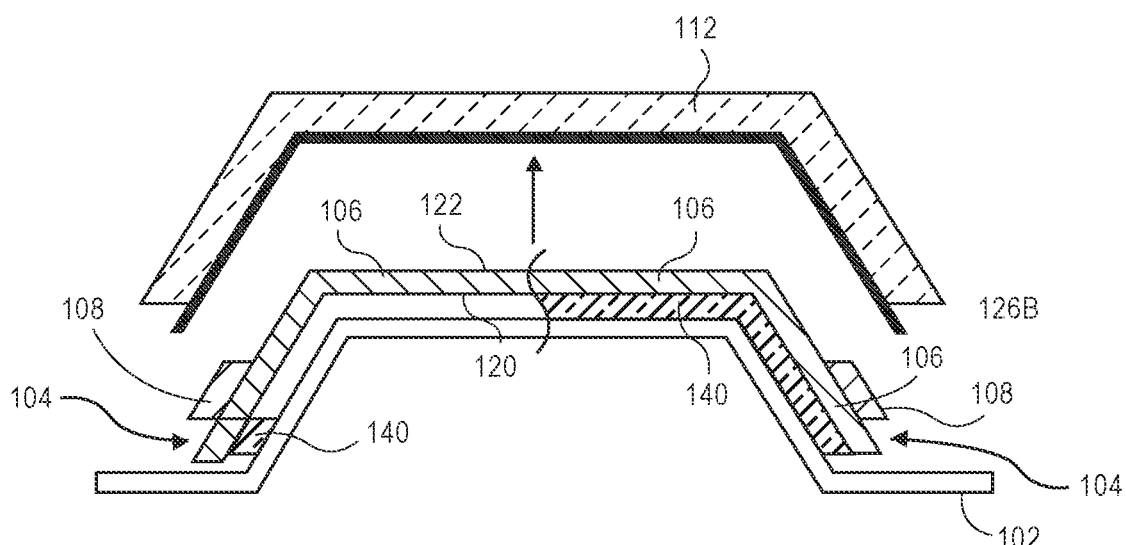
FIG. 17 shows schematic, cross-sectional views of two different parting films on a mold tool, which can be employed as part of a modified process of FIGS. 1A to 1C, according to an example of the present disclosure.

FIG. 17 illustrates an example where the pressure sensitive adhesive 108 is disposed on a minor portion of the second major surface of polymer film 106. As described above, the pressure sensitive adhesive 108 can alternatively be disposed on a major portion of the second major surface 122 of polymer film 106. The right side of FIG. 17 shows an example where the first adhesive 140 is disposed on a major portion of the first surface 120 of polymer sheet 106. The left side of FIG. 17 shows an example where the first adhesive 140 is disposed on a minor portion of the first surface 120 of polymer sheet 106. In addition to other advantages described herein, employing the first adhesive 140 only on a minor, edge portion of the first surface 120 can allow the adhesive 140 to be removed from the parting film 104 by trimming off (e.g., by cutting) the edge portion of the polymer sheet 106.

The pressure sensitive adhesive 108 described above with respect to FIGS. 14 to 17 can be any of the pressure sensitive adhesives disclosed herein. For example, the pressure sensitive adhesive can comprise a block copolymer having a first block and a second block, the first block having a glass transition temperature of less than 20° C. and the second block having a glass transition temperature of greater than 20° C.

Figure 18:
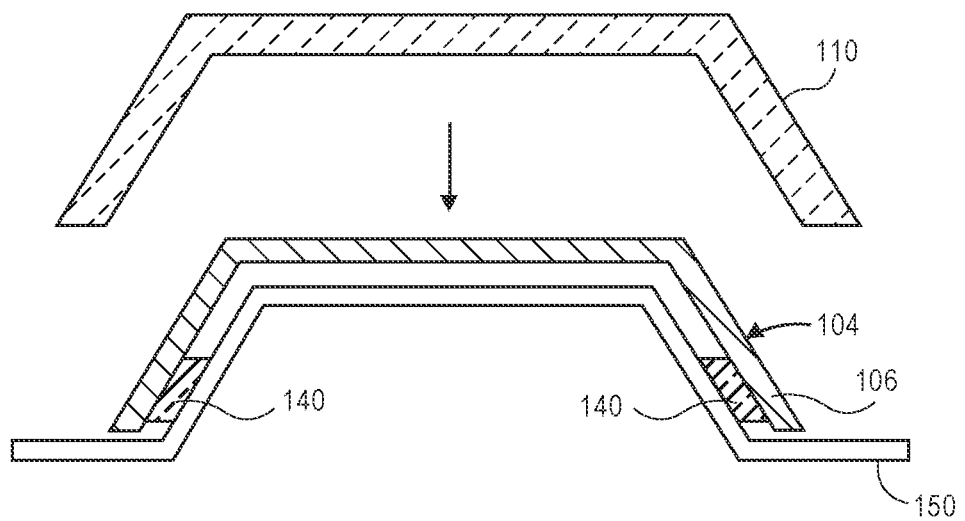
FIG. 18 shows a schematic, cross-sectional view of a parting film on a cure tool, which can be employed as part of a modified process of FIGS. 1A to 1C, according to an example of the present disclosure.

The use of the parting film 104 as described herein allows the pre-preg 110 to be laid-up on a first mold tool 102 and then moved to another tool that is different from the mold tool 102 for curing, such as cure tool 150, illustrated in FIG. 18. This is because the parting film 104 allows for removing the laid-up composite part 112 from the mold tool 102 prior to curing, without damaging or distorting the uncured pre-preg. Laying-up pre-preg 110 on mold tool 102 followed by moving the laid-up pre-preg 110 to cure tool 150 for curing, reduces the amount of time the cure tool 150 is tied up for non-cure processes (e.g., such as laying up the pre-preg), thereby increasing process efficiency and/or reducing cost.

In an example, the cure tool 150 can be covered by a parting film 104 prior to disposing the laid-up pre-preg 110 thereon. Any of the parting films 104 disclosed herein can be used. Employing the parting film 104 on the cure tool 150 can provide for advantages similar to those discussed for mold tool 102 above, including allowing multiple composite parts to be cured without removing the parting film 104 from the cure tool 150, as well as saving cleaning time of the cure tool 150 between cures. Alternatively, instead of using a parting film 104 on cure tool 150, a conventional technique for releasing the pre-preg from the cure tool 150 can be employed, such as where a conventional liquid release agent is applied to the surface of cure tool 150 prior to transferring the pre-preg 110 from the mold tool 102.

In an alternative example, the laid-up composite part is both laid-up and cured on the same mold tool 102. Such a process can reduce the number of tools needed, reduce the risk of damaging the uncured pre-preg 110 and reduce the risk of mis-match between the mold tool 102 and the cure tool 150.

The present disclosure is also directed to a parting film 104 for covering a tool. The parting film 104 can be any of the parting films described herein. For example, the parting film 104 comprises a polymer sheet 106 having a first major surface 120 and a second major surface 122; a first adhesive 140 being disposed on the first major surface 120 of the polymer sheet, the first adhesive 140 for adhering the polymer sheet to the tool 150; and a pressure sensitive adhesive 108 being disposed on the second major surface 122 of the polymer sheet 106. The tool 150 is selected from a mold tool and a cure tool. As described herein, the first adhesive 140 may be the same or different than the pressure sensitive adhesive 108. Any of the materials described herein for the first adhesive 140 and pressure sensitive adhesive 108 can be employed. In an example, the first adhesive 140 is chosen from pressure sensitive adhesives, adhesives of acrylic resin, polyurethane, rubber, styrene-butadiene-styrene copolymer, ethylene vinyl acetate, styrene block copolymers, silicone based adhesives and combinations thereof. The pressure sensitive adhesive 108 may be disposed on a major portion of the second major surface 122 or alternatively, only on a minor portion of the second major surface 122. The first adhesive may be disposed on a major portion of the first major surface 120 or, alternatively, only on a minor portion of the first major surface 120.

The present disclosure is also directed to a tool having any of the parting films described herein disposed thereon. The tool can be any of the tools described herein. For example, the tool can be selected from a mold tool 102 and a cure tool 150.

EXAMPLES

Example 1—Sample Preparation and Adhesion Properties

Pressure sensitive adhesives were applied on non-adhesive parting film substrates using the following process. The adhesives and the parting film substrates are listed in Table 1 below. Parting film substrates were first Corona treated or plasma treated to improve adhesion between the pressure sensitive adhesives and the parting film substrate to prevent delamination during removal of pre-preg. Adhesives were coated onto the Corona treated parting film substrates as solutions in toluene at a loading of 37 g/m$^2$ (one sample was made at 25 g/m$^2$).

Example 2—Sample Preparation and Adhesion Properties

Figure 4:
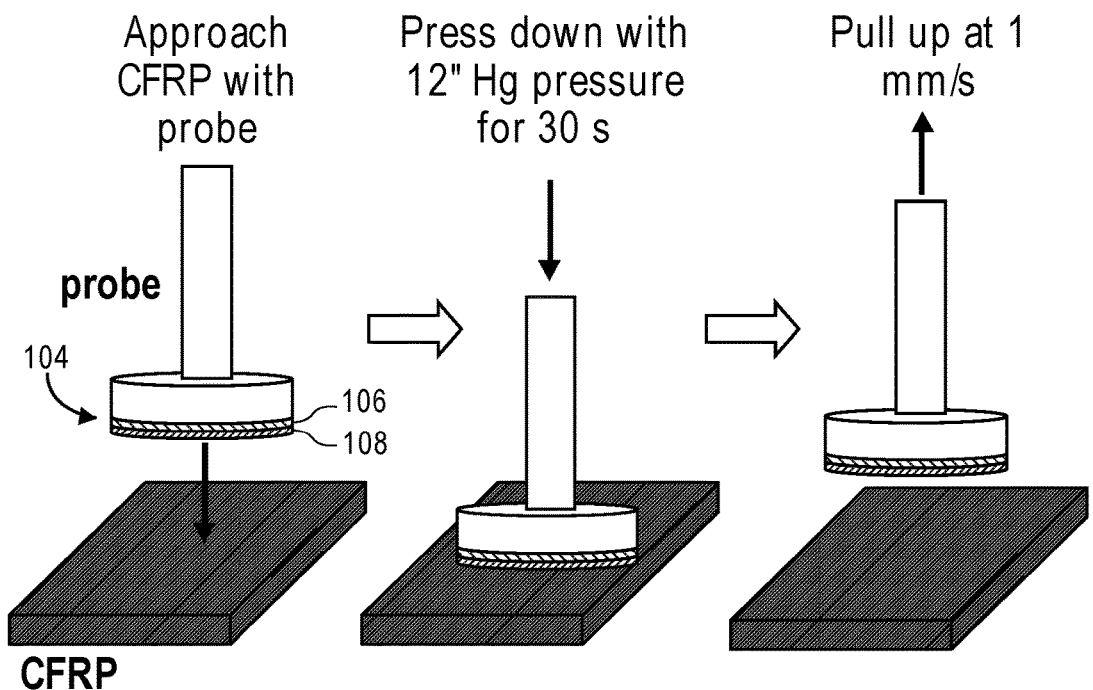
FIG. 4 shows a schematic drawing of a tack testing process, according to an example of the present disclosure. The parting film is on the bottom of the probe with the tunable adhesion surface facing the pre-preg.

Adhesion (e.g., tack) measurements for the prepared samples were made as follows: Mode 1 tack was measured using a Malvern Kinexus rheometer with a 0-50 N load cell. Pre-preg samples one day out of the freezer were preconditioned at 55% relative humidity ("RH") and 72° F. for 4 h. The pre-preg used for testing in the present disclosure was a Toray 3900-2/T800S type pre-preg comprising an intermediate modulus ("IM") carbon fiber and epoxy resin. A parting film including pressure sensitive adhesive was attached to a flat, 8 mm diameter round steel probe and pre-preg was adhered to the rheometer bottom plate. The tack test was performed by bringing the probe down onto the sample, applying pressure equivalent to 12" of mercury on the sample with the probe for 30 seconds, and pulling up the probe at 1 mm/s (FIG. 4). As shown in Table 1, the tested pressure sensitive adhesives show a wide range of adhesion levels to pre-preg.

TABLE 1

Pressure sensitive adhesives on parting films

| Adhesive candidate | Adhesive chemistry | Parting film substrate | Peak tensile strength (kPa) between pre-preg and adhesive coated parting film | Adhesion energy (µJ/cm2) between pre-preg and adhesive coated parting film |
|---|---|---|---|---|
| Dynasol SOLPRENE 1205 | Poly(styrene-butadiene-styrene) rubber | Plasma treated FEP | 21.4 | 0.34 |
| Dynasol SOLPRENE 1205 | Poly(styrene-butadiene-styrene) rubber | PET | 12.4 | 0.17 |
| Elvax 4310 | Ethylene vinyl acetate | PET | 101.7 | 2.99 |
| Kuraray Septone 2063 | Hygrogenated styrenic block copolymer | Plasma treated FEP | 31.9 | 0.61 |
| Kuraray Septone 2063 | Hygrogenated styrenic block copolymer | PET | 49.2 | 0.87 |
| Lubrizol HP 4080-20 | Polyurethane | Plasma treated FEP | 105.6 | 3.56 |
| Lubrizol HP 4080-20 | Polyurethane | PET | 56.8 | 1.35 |
| Ashland Aroset 1450 | Acrylic pressure sensitive adhesive | FEP | 95.0 | 4.30 |
| Ashland Aroset 1450 | Acrylic pressure sensitive adhesive | PET | PSA transferred to pre-preg | N/A |
| Avery Dennison H210 | Hot melt adhesive | FEP & PET | PSA transferred to pre-preg | N/A |
| Cattie 8333 | Hot melt adhesive | FEP & PET | PSA transferred to pre-preg | N/A |
| Kuraray Kurarity LA 2140 | Block polymer of ethyl methacrylate and butyl acrylate | FEP & PET | PSA transferred to pre-preg | N/A |
| Nipol DM 1201 | Terpolymer of acrylonitrile, butadiene and isoprene | PET | PSA transferred to pre-preg | N/A |

SOLPRENE® 1205, a Poly(styrene-butadiene-styrene) rubber, on PET and plasma treated FEP were selected for further testing because they had the lowest adhesion. It was shown using infrared spectroscopy this material was transferring to pre-preg after contact. SOLPRENE 1205 has an average molecular weight of 52,000 g/mol. Thus higher molecular weight styrene-butadiene-styrene polymer adhesives were tested as shown in Table 2.

TABLE 2

Higher molecular weight adhesives tested

| Adhesive candidate | Adhesive chemistry and molecular weight | Peak tensile strength (kPa) between pre-preg and adhesive coated parting film |
|---|---|---|
| SOLPRENE 4302 on corona treated WL3800 PET | 33% styrene 67% butadiene Block polymer Mw = 110k g/mol | 68 |
| CALPRENE 500 on corona treated WL3800 PET | 30% styrene 70% butadiene Random polymer Mw = 110k g/mol | 49 |
| SOLPRENE 9618 on corona treated WL3800 PET (37 g/m$^2$ adhesive) | 31% styrene 69% butadiene Block polymer Mw = 800k g/mol | 43 |
| SOLPRENE 9618 on corona treated WL3800 PET (25 g/m$^2$ adhesive) | 31% styrene 69% butadiene Block polymer Mw = 800k g/mol | 42 |
| CALPRENE 540 on corona treated WL3800 PET | 40% styrene 60% butadiene Multi arm random polymer Mw = 110k g/mol | 21 |

The main conclusions from Table 2 are as follows:
CALPRENE® 540 and SOLPRENE® 9618 were the most attractive samples.
  CALPRENE 540 has a desirable 21 kPa peak adhesion force tack.
  SOLPRENE 9618 has the second lowest peak adhesion force.
Using higher molecular weight adhesives reduced the residue. No or substantially no material was transferred to pre-preg when the molecular weight was >100000 g/mol.
Transitioning from a block polymer structure to a random co-polymer at constant molecular weight also decreased adhesion (SOLPRENE 4302 vs CALPRENE 500).

Except for SOLPRENE 9618, all of the PSAs of Table 2 are formed from linear polymers. SOLPRENE 9618 has branch points where additional polymer chains grow off the main chain, thus it is a "multi-arm" type branched polymer. Further, SOLPRENE 9618 is a random polymer that is highly extensible and has a glass transition temperature below room temperature (e.g., has a glass transition temperature of −89° C. and will undergo 850% elongation without breaking). Both CALPRENE and SOLPRENE are commercially available from Dynasol LLC of Houston, Tex.

Example 3—Residue Analysis

Figure 2:
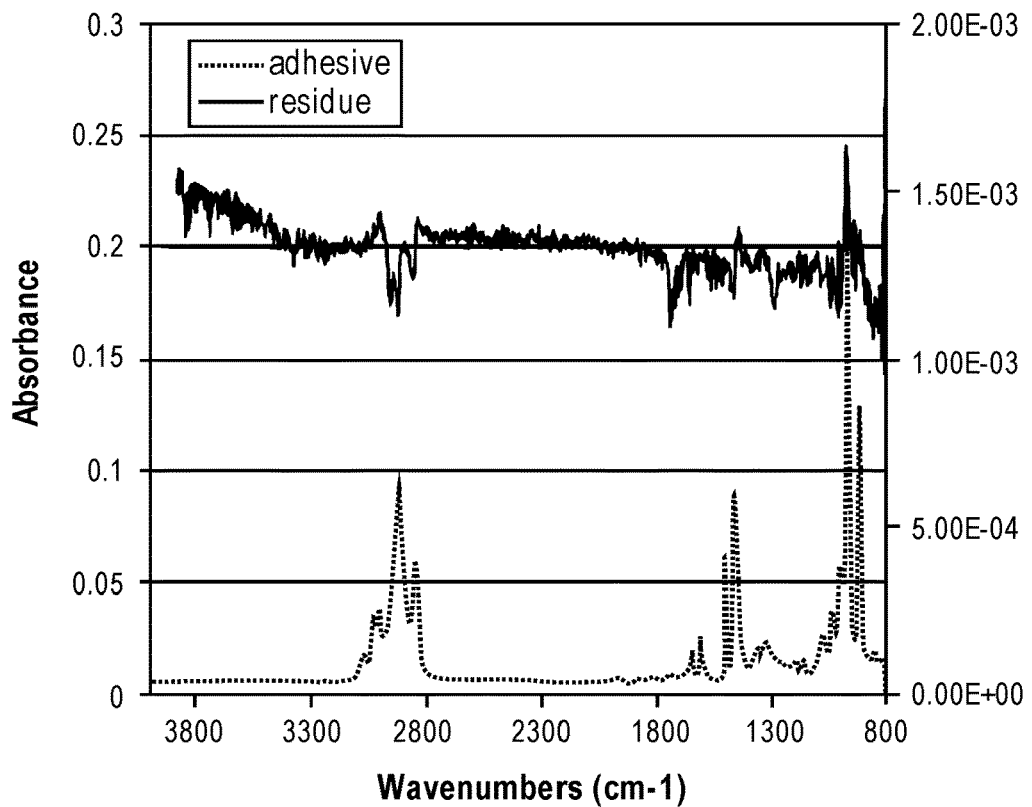
FIG. 2 shows a FTIR spectra of a SOLPRENE® 9618 pressure sensitive adhesive ("PSA") coated parting film and residue after removal of the sample from the ATR crystal, according to an example of the present disclosure. All residue peaks are less than 1% the intensity of the PSA coated parting film peaks.
Figure 3:
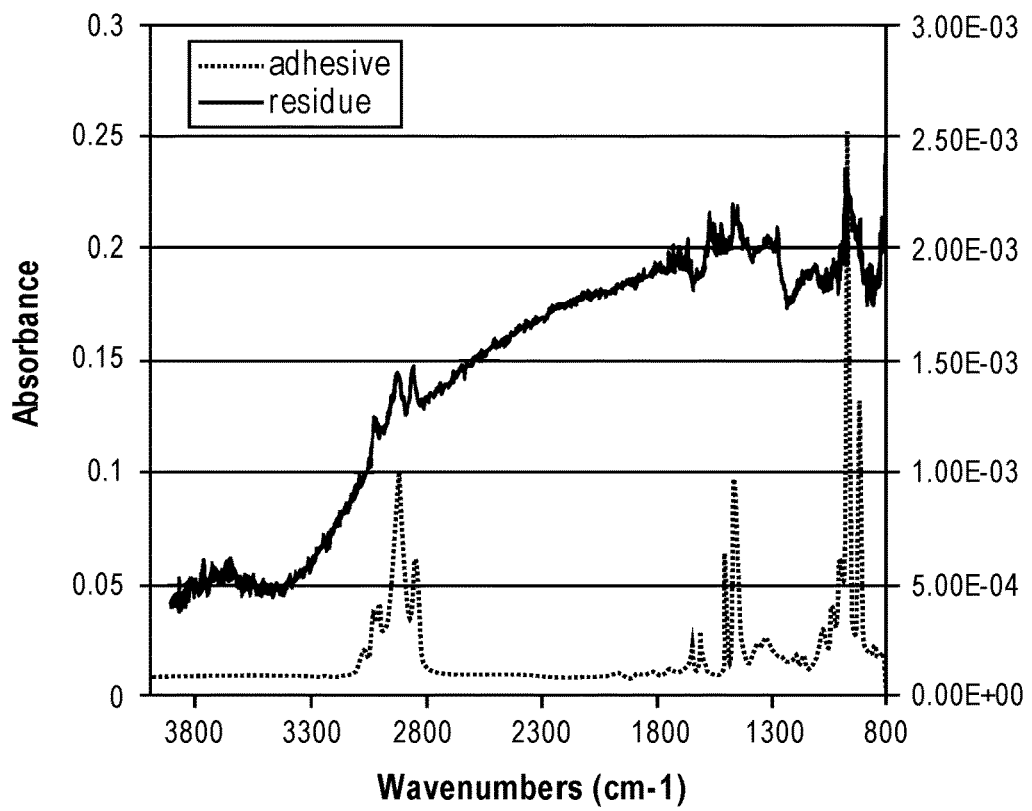
FIG. 3 shows a FTIR spectra of a CALPRENE® 540 adhesive coated parting film and residue after removal of the sample from the ATR crystal, according to an example of the present disclosure. All residue peaks are less than 1% the intensity of the PSA coated parting film peaks.

Residue analysis was performed to investigate the propensity for material transfer from a pressure sensitive adhesive coated parting film to pre-preg during lay-up. The procedure for this test consisted of pressing a material, in this case one of the PSA coated parting films of Table 2, against an FTIR ATR crystal, collecting a 128 scan absorbance spectrum of the material, removing the material, and collecting a 128 scan absorbance spectrum of the residue on the ATR crystal. The residue of SOLPRENE 9618 is shown in FIG. 2 and CALPRENE 540 is shown in FIG. 3. In both cases the residue peak intensity is <1% of the adhesive peak intensity, which is an insignificant residue level.

Example 4—Reusability Data

In order to test reusability for up to 15 lay-up cycles, a method was developed to quantify resin transfer from pre-preg to the pressure sensitive adhesive coated parting film. Resin transfer increases adhesion between parting films and pre-preg, which can result in fiber pull out from the pre-preg if a parting film is reused multiple times. Resin transfer was tested by applying a set pressure between a pressure sensitive adhesive coated parting film and pre-preg, as is discussed in greater detail below. Multiple cycles of resin transfer were performed between pre-preg and CALPRENE 540 and SOLPRENE 9618 followed by a tack test and measuring the resin level on the pressure sensitive adhesive treated parting film, as is also discussed in greater detail below. It should be noted that the tack test was an additional pre-preg contact cycle, thus a sample that has 16 cycles in Table 3 underwent 15 pre-preg contact cycles. Likewise, a sample that has 2 cycles in Table 3 underwent 1 pre-preg contact cycle before the tack test while a sample that underwent one pre-preg contact cycle only experienced a tack test followed by measuring the resin level on the film.

TABLE 3

Resin surface concentration and tack after pre-preg contact cycles

| Sample (# of pre-preg contact cycles including the tack test) | Resin concentration on surface (μg/cm$^2$) | Peak adhesion strength between coated parting film and pre-preg (kPa) | Adhesive energy between coated parting film and pre-preg (μJ/cm$^2$) |
|---|---|---|---|
| CALPRENE 540 (1) | <1.0 | 21 | 0.3 |
| CALPRENE 540 (2) | <1.2 | 14 | 0.8 |
| CALPRENE 540 (16) | <1.2 | 26 | 0.6 |
| CALPRENE 540 (2) duplicate | <1.0 | 15 | 0.4 |
| CALPRENE 540 (16) duplicate | <1.0 | 7 | 0.1 |
| SOLPRENE 9618 (1) | <1.2 | 42 | 0.8 |
| SOLPRENE 9618 (2) | <1.0 | 10 | 0.3 |
| SOLPRENE 9618 (16) | <1.6 | 17 | 1.0 |

In Table 3, the peak adhesion strength is maintained at <30 kPa for multiple pre-preg contact cycles for all samples. Thus extra resin on the film does not increase adhesion as is observed with bare parting films (non-adhesive polymer substrates without the PSA coating). Based on these results, PSA coated parting films are reusable.

To simulate multiple pre-preg lay-ups on the same surface and investigate the extent of resin transfer from pre-preg to the pressure sensitive adhesive coated parting film reported in Table 3 above, pre-preg contact cycles were conducted with test coupons of CALPRENE 540 and SOLPRENE 9618 (the two best performing pressure sensitive adhesives). For each cycle, a 25 mm diameter disk of adhesive coated parting film was laid adhesive-up on an optical glass flat. An ~30 mm×30 mm square piece of pre-preg was laid over the adhesive. The piece of pre-preg still contained the backing sheet, which was facing up. Next a second optical glass flat was laid on the pre-preg completing the stack. To simulate the contact, a 2 kg weight was placed on the stack for 1 minute. This mass is equivalent to ~300 mm Hg. For multiple cycles, the weight was removed and the pre-preg peeled off the adhesive coated parting film and a new piece of pre-preg was used and the process repeated. Up to 15 cycles (with a single coupon of adhesive coated parting film) were performed.

Figure 5:
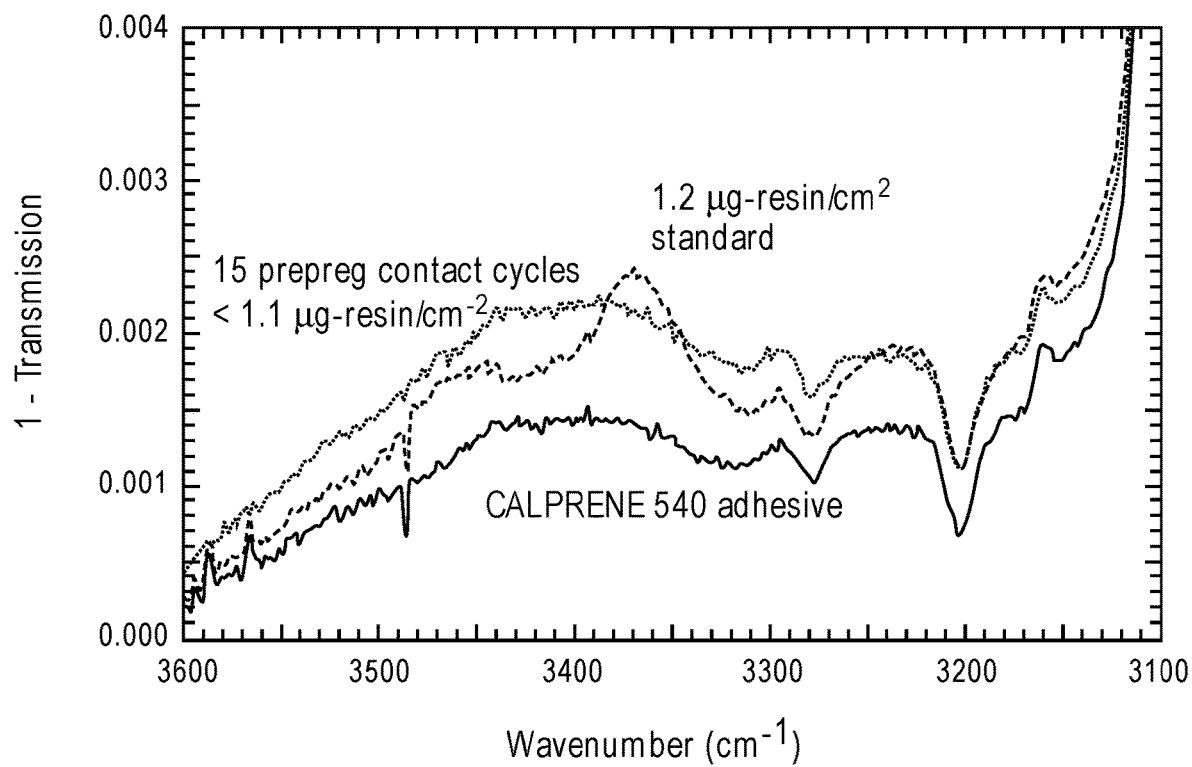
FIG. 5 shows FTIR analysis of resin transfer to CALPRENE 540 adhesive, according to an example of the present disclosure. The intensity at 3365 $cm^{-1}$ gives a surface concentration of <1.1 µg-resin/$cm^2$ after 15 pre-preg contact cycles.
Figure 6:
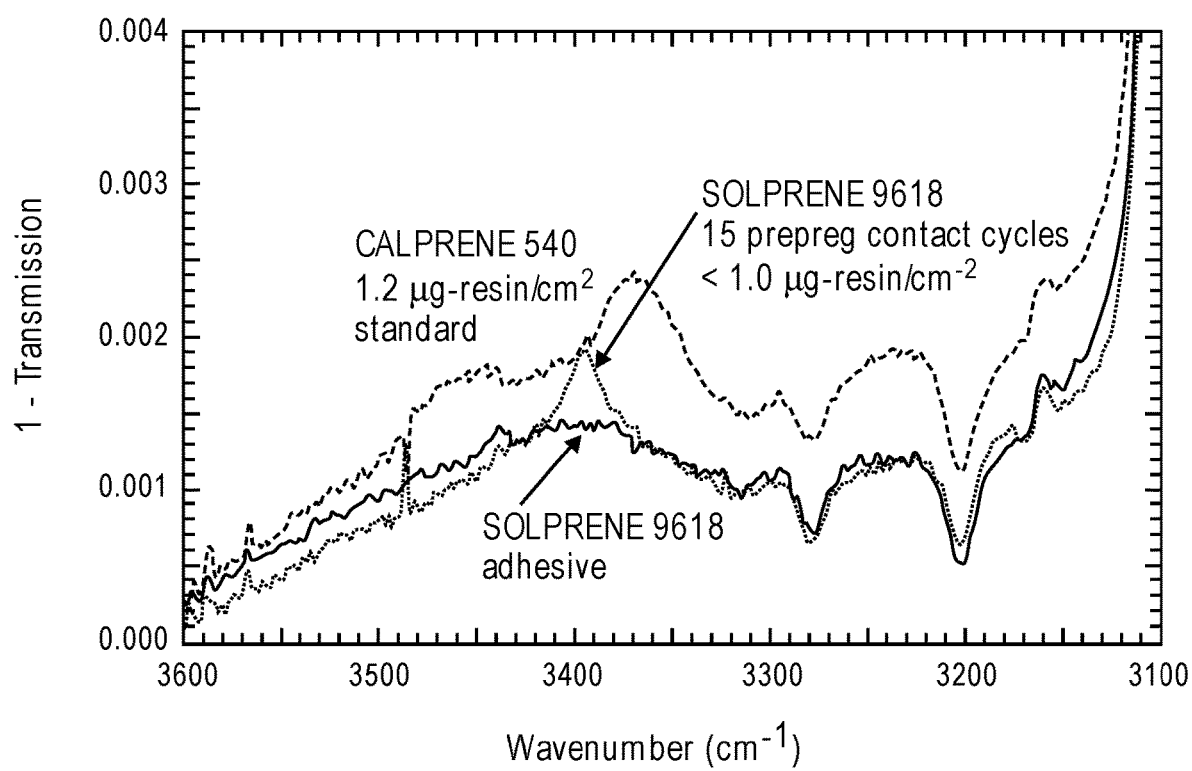
FIG. 6 is a graph of FTIR analysis of resin transfer to SOLPRENE 9618 pressure sensitive adhesive, which shows a surface concentration of <1.0 µg-resin/$cm^2$ after 15 pre-preg contact cycles, according to an example of the present disclosure.

To determine the amount of resin transfer, FTIR spectroscopy was used to measure the resin surface concentration after 1× and 15× pre-preg contact cycles for CALPRENE 540 and SOLPRENE 9618 adhesives on Corona treated PET parting film. Selected results for the CALPRENE adhesive are shown in FIG. 5. After 15× pre-preg contact cycles, the IR shows essentially no peak for the pre-preg resin. Although lacking a peak, the IR intensity is increased relative to the Caplrene 540 adhesive control. The origin of this increased intensity is not fully understood but may originate from surface roughness changes due to contact with the pre-preg. Despite seeing no clear peak from the resin, simply using the IR intensity near 3365 $cm^{-1}$ gives a surface concentration of <1.1 μg-resin/$cm^2$, which is close to our estimated detection limit for the IR measurement. The results for 15× cycles with SOLPRENE 9618 are shown in FIG. 6. For this test, a clear peak from the resin is seen, although it is slightly shifted from the peak in the CALPRENE standard. The cause of this shift is not understood. Nevertheless, using the peak intensity gives a surface concentration of <1.0 μg-resin/$cm^2$.

Figure 7:
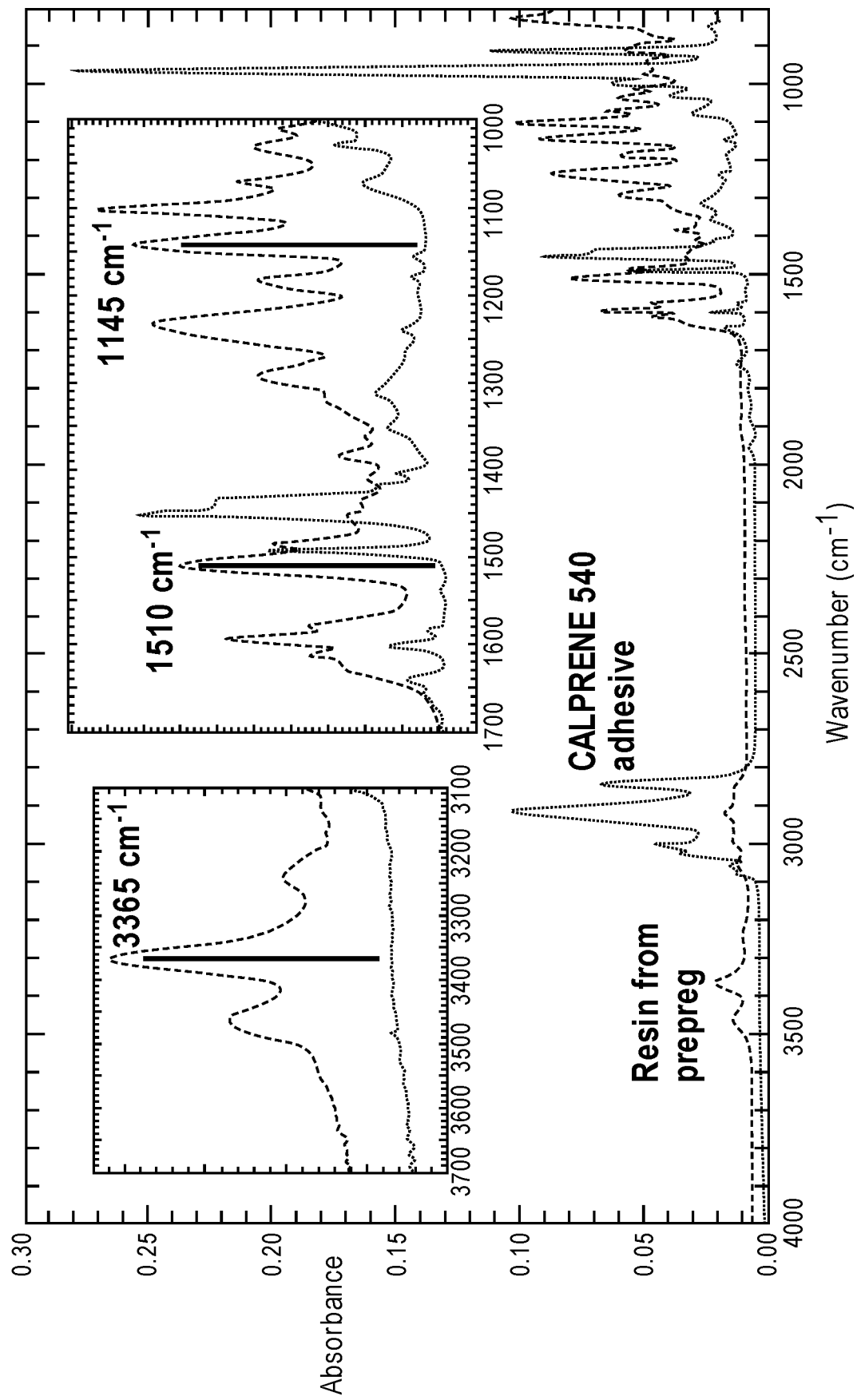
FIG. 7 shows FTIR spectra of CALPRENE 540 pressure sensitive adhesive and pre-preg resin, according to an example of the present disclosure. Insets show detail around three regions where bands from the resin in the pre-preg do not overlap with bands from the adhesive; (left inset) around 3365 $cm^{-1}$ and (right inset) around 1510 $cm^{-1}$ and 1145 $cm^{-1}$.

Additional details regarding the resin transfer quantification method will now be discussed. Use of IR spectroscopy to quantify resin build-up on the adhesive requires at least moderately strong adsorption bands from the resin that do not significantly overlap with bands from the adhesive. FTIR spectra of the as-received CALPRENE 540 adhesive and a piece of pre-preg (pressed with force against the ATR plate) are shown in FIG. 7. The spectrum of the pre-preg has several bands from the resin that do not overlap with bands from the adhesive. For the band at 3365 $cm^{-1}$, there are no nearby bands from the adhesive and the intensity in that region is featureless (FIG. 7, left inset). Two other bands without significant overlap occur at 1145 $cm^{-1}$ and 1510 $cm^{-1}$ (FIG. 7, right inset). The band at 3365 $cm^{-1}$ is only about 20% as strong as the bands at 1145 $cm^{-1}$ and 1510 $cm^{-1}$. However, these bands are not as favorable as the band at 3365 $cm^{-1}$ because there is a weak band from the adhesive near 1145 $cm^{-1}$ and a relatively strong band near 1510 $cm^{-1}$. For the analysis method described herein, the band at 3365 $cm^{-1}$ was used.

Figure 8:
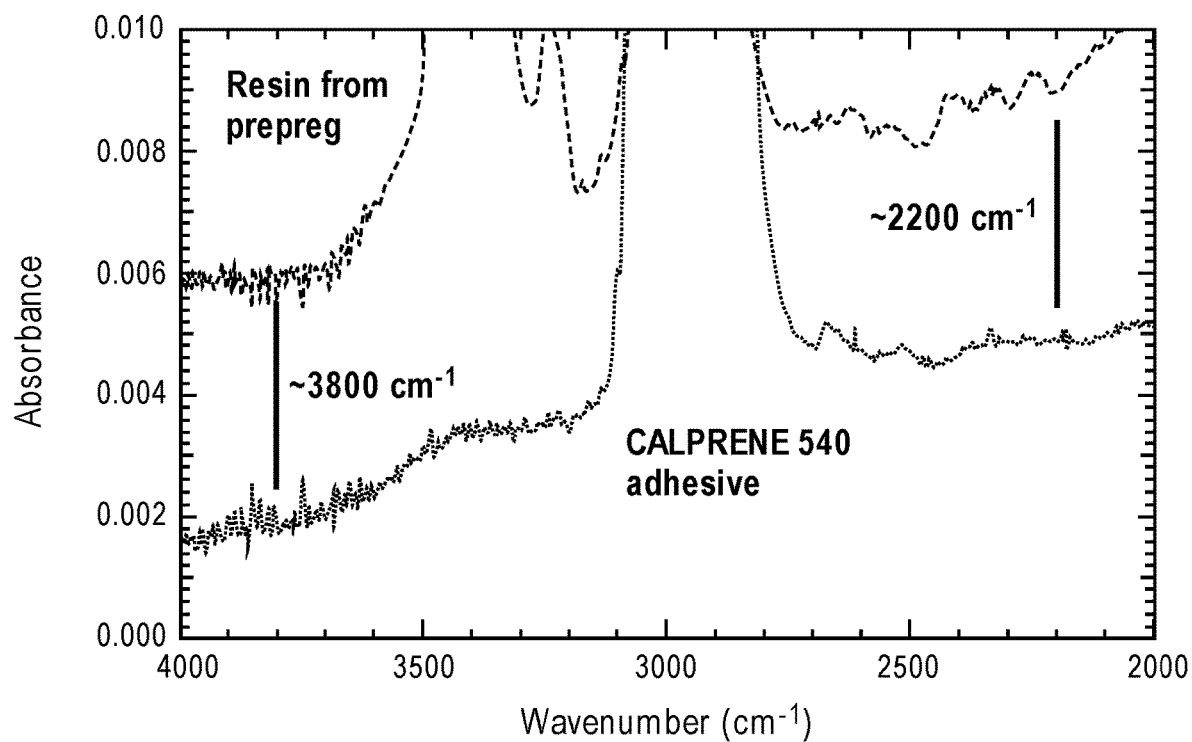
FIG. 8 shows an expanded view of the background region for spectra in FIG. 7. The offset of the baselines can be seen. The approximate locations for a two-point linear background correction are indicated.

As seen, for example, in FIG. 7 and in detail in FIG. 8, the baselines for different spectra can differ by up to ~0.01 absorbance units. While small, this difference is unacceptable for accurate quantification of small amounts of resin build-up on the adhesive surface. To account for this difference, a two point linear background was subtracted from the spectra. The preferred locations of the background points at ~3800 $cm^{-1}$ and ~2200 $cm^{-1}$ are shown in FIG. 8.

Figure 9:
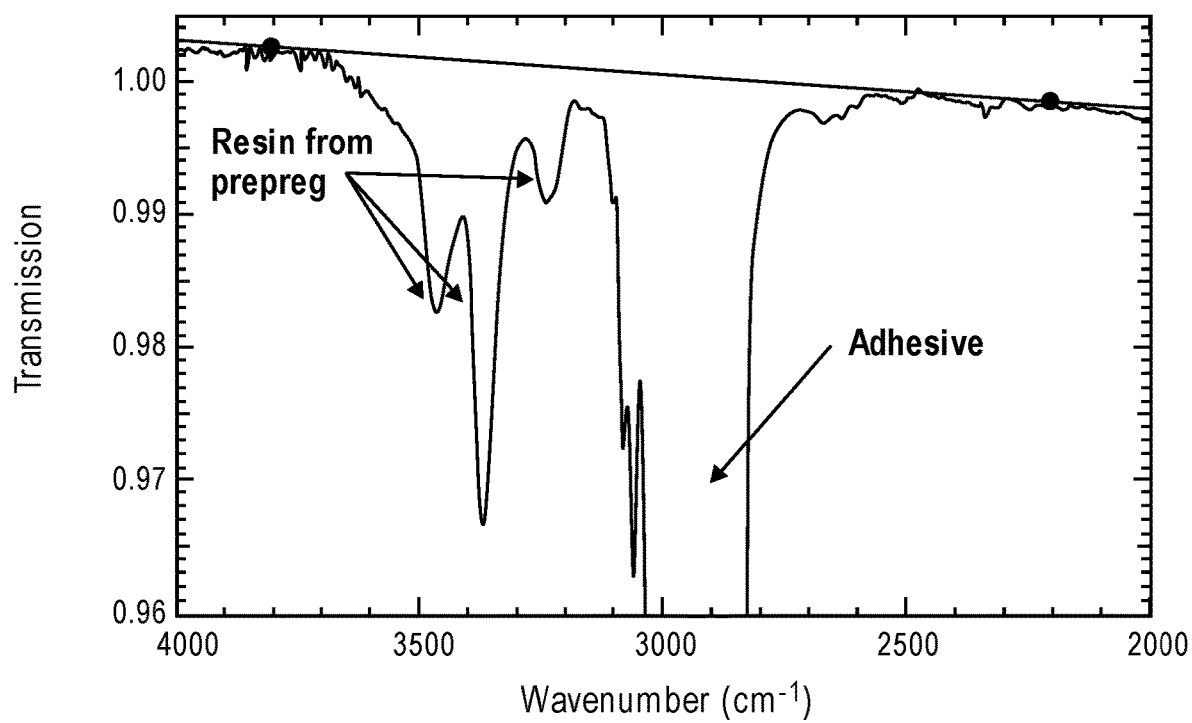
FIG. 9 shows a spectrum and background in transmission for pressure sensitive adhesive with epoxy resin from the pre-preg on the surface, according to an example of the present disclosure. Bands from the resin and adhesive are indicated. The background (straight black line) was obtained from the two points shown by the dots at wavelengths of 3800 and 2200.

Prior to subtracting the background, the spectra intensity were converted from absorbance [I(abs)] into transmission [I(trans)] using the standard relationship, I(trans)=$10^{-I(abs)}$, so that intensity changes could be linearly related to concentration. An example, of a spectrum containing resin deposited on the adhesive (as described below) in transmission together with and linear background is shown in FIG. 9. A linear background was found to fit the spectra well over the region 2000 $cm^{-1}$ to 4000 $cm^{-1}$, which contains the preferred band for quantifying the resin (3365 $cm^{-1}$) and C-H stretch bands from the adhesive (major band at 2916 $cm^{-1}$).

To obtain a background corrected spectrum in transmission but displayed with a zero (as opposed to a unity or 100%) baseline designated as I(trans, background corrected, zero baseline), the spectra was subtracted from the background [I(background)] using I(trans, background corrected, zero baseline)=I(background)−I(trans). For example, in FIG. 9, the straight line background between the two data points minus the lower spectrum shown in the graph.

Figure 10:
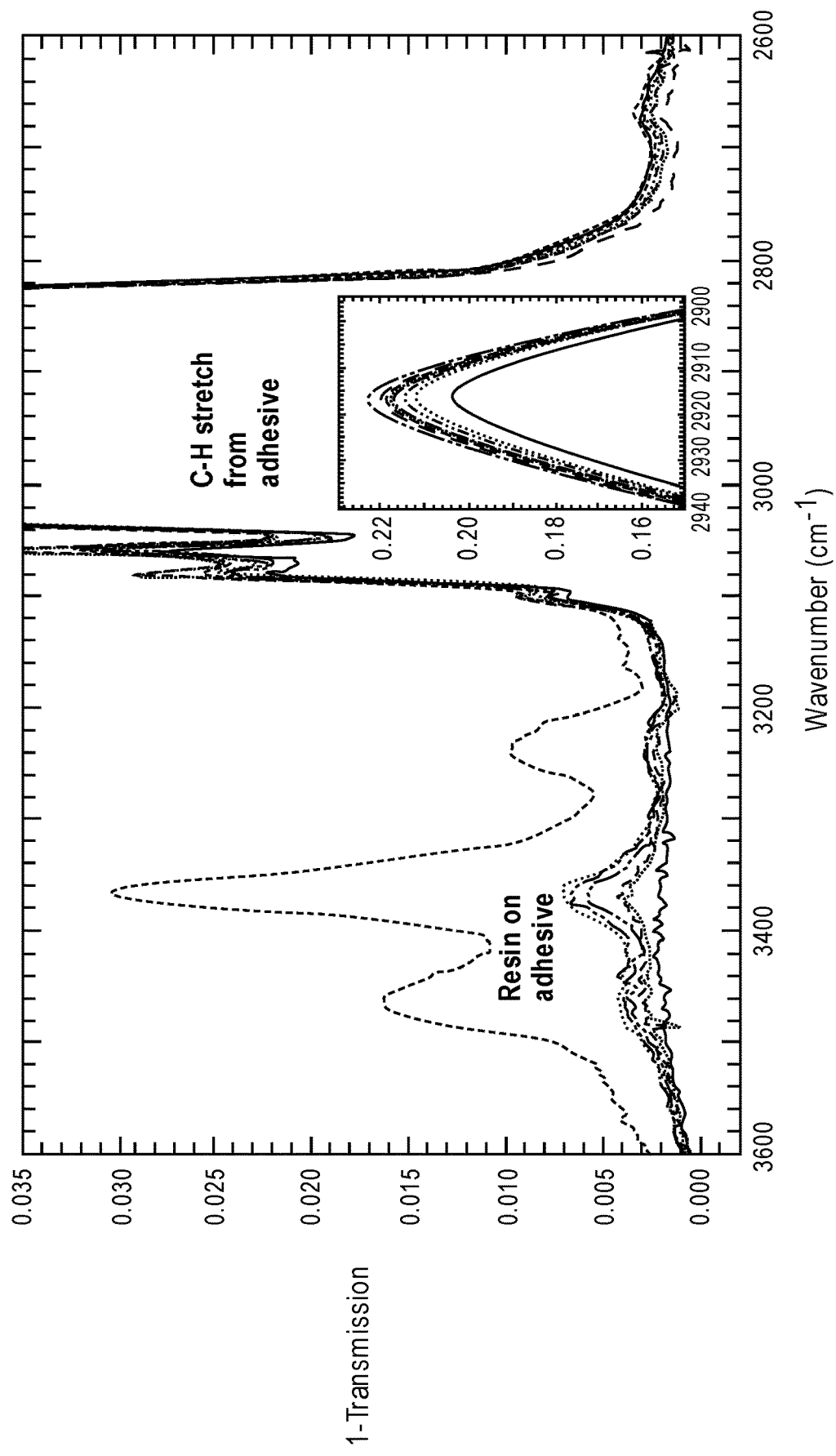
FIG. 10 shows background corrected, zero baseline, absorption spectra of pre-preg resin on pressure sensitive adhesive, the adhesive without resin and adhesive with varying amounts of resin, according to an example of the present disclosure. The inset shows the peak intensity for the C-H stretch of the adhesive.

Several examples of the resulting spectra are shown in FIG. 10. With this conversion to transmission and background correction, the baselines for most spectra taken, e.g., FIG. 10, are nearly indistinguishable. Importantly, the band at 3365 $cm^{-1}$ from resin build-up is clearly seen with transmission intensity spanning at least a factor of 20 relative to a common baseline. This enables the amount of resin on the adhesive to be quantified, as described below. Ideally, these transformations would also yield indistinguishable peak intensities for the adhesive. However, as shown in the inset to FIG. 10, the peak intensity for the main C-H stretch at 2916 $cm^{-1}$ varies by 10%, from 0.20 to 0.22. Thus, an additional multiplicative normalization could be applied to the spectra. This was not done because the variability is relatively small, only ~10%.

Using spectra such as those shown in FIG. 10, resin build-up on the adhesive may be quantified by determining a calibration curve for the peak intensity at 3365 $cm^{-1}$, (e.g., intensity versus resin concentration). This calibration curve is determined by measuring spectra for a set of resin-on-adhesive calibration samples, which have independently known resin concentrations. To fabricate calibration samples, standard solutions of resin dissolved in acetone were prepared as follows.

A stock solution of pre-preg resin dissolved in acetone was prepared by sonicating a 0.7 g sample of pre-preg in 30 g of acetone in a sealed vial for ~5 min. Immediately after sonication the acetone solution was still cloudy. The sample was allowed to sit for ~3 days during which time the solution cleared. The solution was then poured off from the remaining pre-preg to fix the resin concentration. The resin concentration was determined by evaporating 5.2516 g of solution in a 60° C. oven. A residual weight due to the resin of 0.0356 g was obtained. Thus, the stock solution had a concentration of 0.0068 g-resin/g-solution.

To deposit resin onto the adhesive several procedures were evaluated. The two most important and related criteria for evaluating the procedures are 1) spatially uniformity over the ATR plate area and 2) reproducible intensity of the resin band at 3365 $cm^{-1}$ for nominally identical resin concentration samples.

The procedure selected used diluted resin/acetone solutions deposited as many small droplets onto heated samples of the adhesive. A 10 μl capillary pipette was used with small drops dabbed over a chosen area by repeatedly lightly touching the end of the capillary to the adhesive. The pipette was used without a plunger and was filled by capillary action. Each "dab" was roughly estimated to deposit<~0.5 μl, ~20 droplets for 10 μl of the resin solution. Each drop spread over only a small portion of the area, so the overall uniformity was achieved by distributing these droplets over the ATR area by hand. In addition, the adhesive substrates were heated by being laid on a hot plate set at 70° C. In contrast, if a full 10 µl drop was deposited in a single step using the pipette with the plunger, evaporation of the drop was not uniform. As the drop evaporated, it would break up into smaller drops with the result that the deposited resin (which could be discerned optically) ended up in small concentrated spots, often near the edges of the initial drop. Using many small droplets mitigated this problem, although uniformity remained an issue. The measured IR intensities still had considerable scatter but averaging ~5 samples for each resin concentration appeared to give consistent results.

From the stock pre-preg resin/acetone solution, made with a resin concentration of 0.0068 g-resin/g-solution, dilutions of 1:10 to 1:500, were prepared. Using these solutions, standard resin-on-adhesive samples were prepared by dabbing 10 µl of solution onto the adhesive over a 0.75 cm diameter circular spot, an area of 0.44 $cm^2$. These standard samples were used to obtain the calibration curve shown in FIG. 11 from the peak intensity of the (1-Transmission) background corrected IR spectra at 3365 $cm^{-1}$. The top axis shows the diluted resin solution concentrations, which can be used as a guide for future calibrations. The bottom axis shows the resin surface concentration, determined from the resin solution concentration, the solution density (assumed to be the density of acetone, 0.791 $g/cm^3$), the total volume deposited (10 µl=0.01 $cm^3$) and the area (0.44 $cm^2$). For example, for a 1:50 dilution: 0.0068 g-resin/g-acetone·⅟₅₀ ·0.791 g-acetone/$cm^3$·0.01 $cm^3$/0.44 $cm^2$=2.4 µg-resin/$cm^2$. The behavior appears linear although there is scatter from the nonuniformity of the standard samples. The line shown is a fit for the samples with resin surface concentrations from 1.2 µg/$cm^2$ to 12 µg/$cm^2$.

Figure 11:
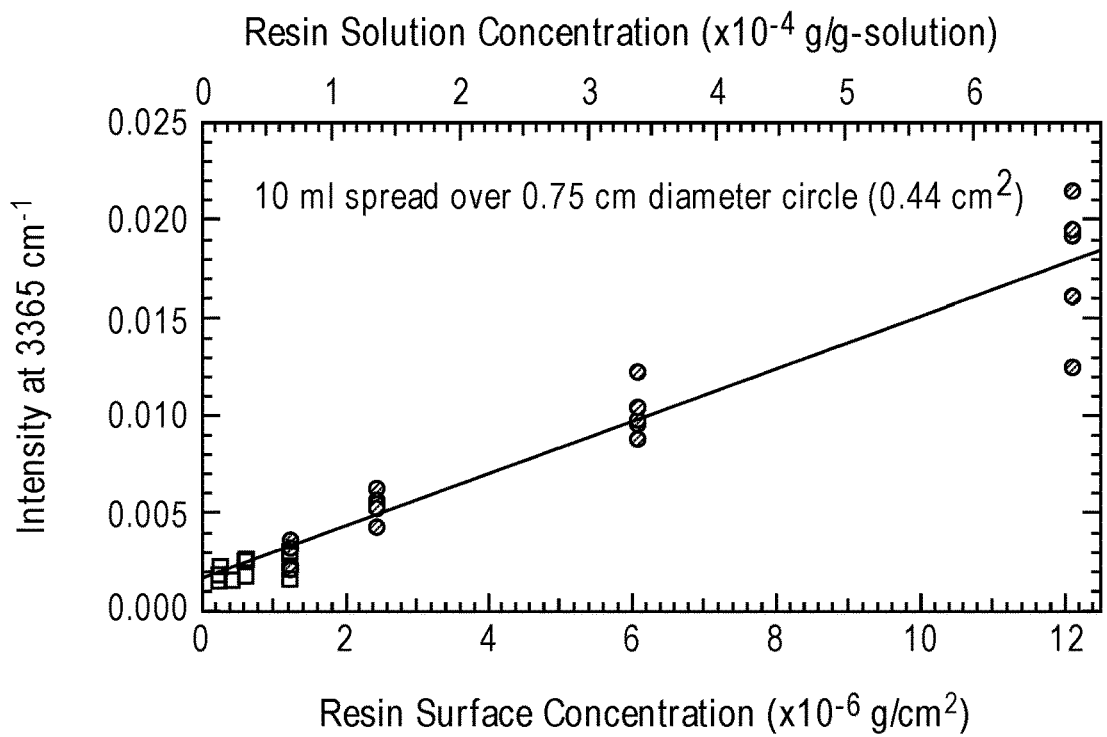
FIG. 11 shows a calibration curve from standard samples of epoxy resin from pre-preg on pressure sensitive adhesive, according to an example of the present disclosure. The top axis gives resin solution concentrations from stock solution dilutions of 1:10, 1:20, 1:50, 1:100, 1:200, 1:300, and 1:500. Bottom axis gives resin surface concentration from 10 µl drops spread over 0.44 $cm^2$. The circles show data points from 32 scan spectra. Open squares show data from 1024 scan spectra, used for low, <1 µg/$cm^2$, concentrations and to determine the detection limit as described below (FIG. 13). Linear fit of the 32 scan spectra is shown for dilutions of 1:10, 1:20, 1:50, and 1:100.
Figure 12:
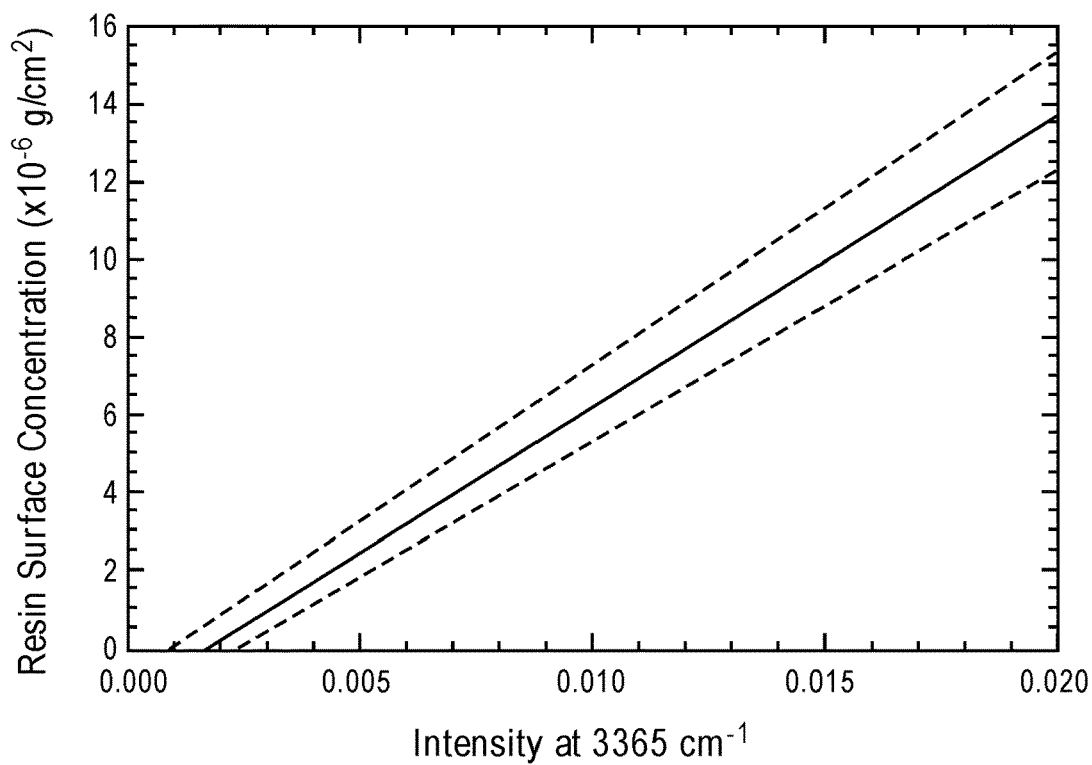
FIG. 12 shows a calibration curve for resin transfer to adhesive for an HRL FTIR system, according to an example of the present disclosure. Resin surface concentration from IR intensity at 3365 cm-1; best fit (solid line), ±1σ upper and lower limits (dashed lines).

From the linear fit shown in FIG. 11, the resin surface concentration for an unknown sample may be determined by inverting the fit. This inversion (surface resin concentration as a function of IR intensity at 3365 $cm^{-1}$) is shown in FIG. 12 together with upper and lower limits determined from the ±1σ variation of the linear fitting parameters, the slope and intercept. For this calibration: Resin concentration (g/$cm^2$) =[(Intensity at 3365 $cm^{-1}$)−0.00164]/1345. The lower limit is: Resin concentration (g/$cm^2$)=[(Intensity at 3365 $cm^{-1}$)− 0.00232]/1445. The upper limit is: Resin concentration (g/$cm^2$)=[(Intensity at 3365 $cm^{-1}$)−0.00095]/1245. We note that this calibration strictly applies only to the FTIR system used for these experiments and should be used with caution on other systems. Ideally, for each system used, a set of standard samples should be measured as shown in FIG. 11.

Figure 13:
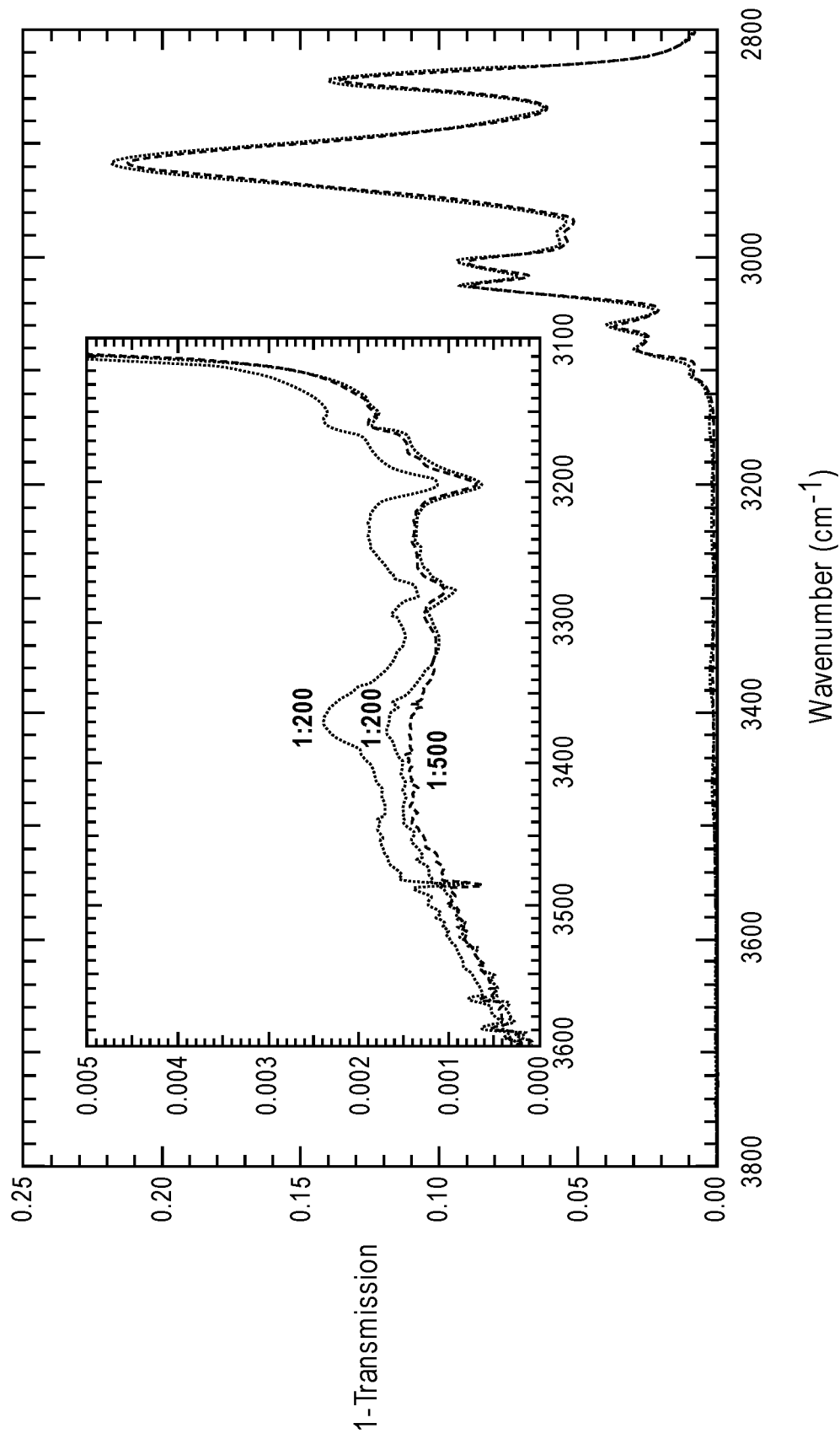
FIG. 13 shows a low concentration of pre-preg resin on CALPRENE 540 adhesive, according to an example of the present disclosure. Spectra are shown for standard samples from dilutions of 1:200 (dotted lines, 2 spectra) and 1:500 (dashed line). After background correction, intensities for the adhesive (2800 $cm^{-1}$ to 3100 $cm^{-1}$) overlay to within <5%. Inset shows region for resin absorption on an approximately 50× expanded scale.

From the low concentration samples (FIG. 11, dilutions of 1:200, 1:300, and 1:500) a detection limit for the pre-preg resin on the adhesive measured by IR was estimated. FIG. 13 shows background corrected 1-Transmission spectra for two 1:200 dilution standard samples (nominally 0.6 µg/$cm^2$) shown as dotted lines, and one 1:500 dilution sample (nominally 0.24 µg/$cm^2$) shown as dashed lines. These spectra were acquired with 1024 scans. No peak is observed for the 1:500 dilution sample. Similarly no peaks were observed for 1:300 dilution samples (not shown). For the 1:200 samples, one spectrum shows a clear peak while the other shows just the beginnings of a peak rising above the background. From these data and the fits shown in FIG. 11, we estimate the detection limit for this measurement to be about 1 µg-resin/ $cm^2$-adhesive.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A method of making a composite part, the method comprising:
   covering a mold tool for a composite part with a parting film, the parting film comprising:
   a polymer sheet having a first major surface and a second major surface; and
   a first adhesive disposed on the first major surface of the polymer sheet, the first adhesive adhering the polymer sheet to the mold tool;
   laying up at least one layer of pre-preg on the parting film covering the mold tool to form a laid-up composite part;
   removing the laid-up composite part from the parting film; and
   repeating the laying up and the removing the laid-up composite part a plurality of times without removing the parting film from the mold tool.

2. The method of claim 1, wherein the first adhesive is chosen from pressure sensitive adhesives, adhesives of acrylic resin, polyurethane, rubber, styrene-butadiene-styrene copolymer, ethylene vinyl acetate, styrene block copolymers, silicone based adhesives and combinations thereof.

3. The method of claim 1, wherein the first adhesive is disposed only on a minor portion of the first major surface, the minor portion including an edge of the first major surface.

4. The method of claim 1, wherein the first adhesive is disposed on a major portion of the first major surface.

5. The method of claim 1, wherein the parting film further comprises a pressure sensitive adhesive disposed on the second major surface of the polymer sheet, the parting film being positioned so that the polymer sheet is between the mold tool and the pressure sensitive adhesive.

6. The method of claim 5, wherein the pressure sensitive adhesive is disposed only on a minor portion of the second major surface.

7. The method of claim 5, wherein the pressure sensitive adhesive is disposed on a major portion of the second major surface.

8. The method of claim 5, wherein the pressure sensitive adhesive comprises a material chosen from adhesives of acrylic resin, polyurethane, rubber, styrene-butadiene-styrene copolymer, ethylene vinyl acetate, styrene block copolymers and combinations thereof.

9. The method of claim 5, wherein the pressure sensitive adhesive comprises a material chosen from adhesives of styrene-butadiene-styrene block copolymers, styrene-butadiene-styrene random copolymers and combinations thereof.

10. The method of claim 5, wherein the pressure sensitive adhesive comprises a block copolymer having a first block and a second block, the first block having a glass transition temperature of less than 20° C. and the second block having a glass transition temperature of greater than 20° C.

11. The method of claim 1, further comprising removing the laid-up composite part from the mold tool prior to curing, then curing the laid-up composite part on a second tool that is different from the mold tool.

12. The method of claim 1, further comprising curing the laid-up composite part on the mold tool.

13. The method of claim 1, wherein the polymer sheet comprises a material chosen from polymers of polyethylene, polyethylene terephthalate ("PET"), fluorinated ethylene propylene ("FEP"), nylon and combinations thereof.

14. A method of making a composite part, the method comprising:
  covering a mold tool for a composite part with a parting film, the parting film comprising (i) a polymer sheet having a first major surface and a second major surface and (ii) a pressure sensitive adhesive disposed on the second major surface;
  laying up at least one layer of pre-preg on the parting film covering the mold tool to form a laid-up composite part, the pre-preg being adhered to the parting film by the pressure sensitive adhesive; and
  removing the laid-up composite part from the parting film,
  wherein the laying up and the removing of the laid-up composite part are repeated a plurality of times without removing the parting film from the mold tool.

15. The method of claim 14, further comprising curing the laid-up composite part on the mold tool.

16. The method of claim 14, wherein a second adhesive is disposed on the first major surface of the polymer sheet, the second adhesive adhering the polymer sheet to the mold tool.

17. The method of claim 16, wherein the second adhesive is different than the pressure sensitive adhesive.

18. The method of claim 14, wherein the pressure sensitive adhesive is disposed only on a minor portion of the second major surface.

19. The method of claim 18, wherein the at least one layer of pre-preg comprises a first pre-preg layer and one or more additional pre-preg layers, the first pre-preg layer comprising a composite region that is part of the laid-up composite part and an excess region, the excess region extending past an edge of the one or more additional pre-preg layers, the excess region contacting the pressure sensitive adhesive.

20. The method of claim 19, further comprising removing the excess region from the laid-up composite part.

* * * * *